United States Patent
Kamada et al.

(10) Patent No.: US 10,435,577 B2
(45) Date of Patent: Oct. 8, 2019

(54) INK SET AND IMAGE FORMING METHOD

(71) Applicant: FUJIFILM CORPORATION, Minato-ku, Tokyo (JP)

(72) Inventors: Toshihiro Kamada, Kanagawa (JP); Tsutomu Umebayashi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/137,494

(22) Filed: Sep. 20, 2018

(65) Prior Publication Data

US 2019/0023928 A1   Jan. 24, 2019

Related U.S. Application Data

(63) Continuation of application No. PCT/JP2017/006905, filed on Feb. 23, 2017.

(30) Foreign Application Priority Data

Mar. 31, 2016   (JP) .................. 2016-071746

(51) Int. Cl.
| | |
|---|---|
| *C09D 11/40* | (2014.01) |
| *B41J 11/00* | (2006.01) |
| *C09D 11/101* | (2014.01) |
| *B41J 2/01* | (2006.01) |
| *B41M 5/00* | (2006.01) |
| *B41J 2/21* | (2006.01) |
| *C09D 11/36* | (2014.01) |

(52) U.S. Cl.
CPC .............. *C09D 11/40* (2013.01); *B41J 2/01* (2013.01); *B41J 2/21* (2013.01); *B41J 11/002* (2013.01); *B41M 5/00* (2013.01); *B41M 5/0023* (2013.01); *C09D 11/101* (2013.01); *C09D 11/36* (2013.01)

(58) Field of Classification Search
CPC ......... C09D 11/40; C09D 11/54; C09D 11/30; C09D 11/101
USPC .................................................. 347/98, 100
See application file for complete search history.

(56) References Cited

U.S. PATENT DOCUMENTS

| | | | | |
|---|---|---|---|---|
| 8,673,994 B2 * | 3/2014 | Nakano | ............... | C09D 11/101 106/31.13 |
| 2004/0266907 A1 | 12/2004 | Sugita et al. | | |
| 2006/0187285 A1 | 8/2006 | Oyanagi et al. | | |
| 2008/0146689 A1 | 6/2008 | Oyanagi et al. | | |
| 2008/0213518 A1 | 9/2008 | Oyanagi et al. | | |
| 2013/0230701 A1* | 9/2013 | Mochizuki | ........... | C09D 11/101 428/195.1 |
| 2013/0258015 A1 | 10/2013 | Mizutaki et al. | | |
| 2016/0250864 A1 | 9/2016 | Takatsu et al. | | |
| 2018/0282559 A1 | 10/2018 | Umebayashi | | |

FOREIGN PATENT DOCUMENTS

| | | |
|---|---|---|
| EP | 2270109 A1 | 1/2011 |
| JP | 2006-123542 A | 5/2006 |
| JP | 2006-137183 A | 6/2006 |
| JP | 2008-174713 A | 7/2008 |
| JP | 2009-221416 A | 10/2009 |
| JP | 2010-046844 A | 3/2010 |
| JP | 2010-270220 A | 12/2010 |
| JP | 2013-181163 A | 9/2013 |
| JP | 2013-203873 A | 10/2013 |
| JP | 2015-040281 A | 3/2015 |
| JP | 2015-074120 A | 4/2015 |
| WO | 2004/007626 A1 | 1/2004 |
| WO | 2011/021052 A1 | 2/2011 |
| WO | 2012/110802 A1 | 8/2012 |
| WO | 2014/188209 A1 | 11/2014 |
| WO | 2017/104845 A1 | 6/2017 |

OTHER PUBLICATIONS

Extended European Search Report dated Feb. 27, 2019, issued in corresponding EP Patent Application No. 17773916.6.
International Search Report issued in International Application No. PCT/JP2017/006905 dated Apr. 4, 2017.
Written Opinion of the ISA issued in International Application No. PCT/JP2017/006905 dated Apr. 4, 2017.

* cited by examiner

*Primary Examiner* — An H Do

(74) *Attorney, Agent, or Firm* — Solaris Intellectual Property Group, PLLC

(57) ABSTRACT

Provided are an ink set having: a colored ink including a solvent A1 at a content of 30% by mass or more, a polymer C1, and a colorant; and a clear ink including a solvent A2 at a content of 30% by mass or more and a bifunctional or higher-functional (meth)acrylate compound X2 having a weight average molecular weight of 1,000 to 30,000, the clear ink including X2 at a content of 5% by mass or more, in which the solubility of C1 in A2 is 10% by mass or higher; and an image forming method using this ink set.

20 Claims, No Drawings

INK SET AND IMAGE FORMING METHOD

CROSS-REFERENCE TO RELATED APPLICATION

This application is a Continuation of International Application No. PCT/JP2017006905, filed Feb. 23, 2017, which claims priority to Japanese Patent Application No. 2016-071746 filed Mar. 31, 2016. Each of the above applications is hereby expressly incorporated by reference, in its entirety, into the present application.

BACKGROUND OF THE INVENTION

1. Field of the Invention

The present invention relates to an ink set and an image forming method.

2. Description of the Related Art

Various technologies concerning the inks used for image formation and ink sets including two or more kinds of inks in combination are known.

For example, as an inkjet ink for forming images on containers made of polyethylene terephthalate (PET), an inkjet ink including (i) an organic solvent included at a content of 30% by weight or more with respect to the total amount of the ink, (ii) a radiation-curable oligomer and/or a radiation-curable polyfunctional monomer, (iii) a photopolymerization initiator, (iv) a coloring agent included at a content of 10% by weight or less with respect to the total amount of the ink, and (v) a thermoplastic resin included at a content of a content of 8% by weight to 25% by weight with respect to the total amount of the ink and having a weight average molecular weight of 1,500 to 70,000, is known (see, for example, WO2014188209A)

As an inkjet printing method by which highly glossy printed matters exhibiting no bleeding are obtained, there is known an inkjet printing method comprising a second ink layer forming step of jetting out a second ink on a first ink layer formed on a recording medium, subsequently drying the second ink, and thereby forming a second ink layer; and a third ink layer forming step of jetting out a third ink on the second ink layer, drying the third ink, and thereby forming a third ink layer, wherein the drying time in the second ink layer forming step is shorter than the drying time in the third ink layer forming step (see, for example, JP2015-74120A). It is disclosed in JP2015-74120A that the first ink that forms the first ink layer is an ink soluble in a solvent, the second ink and the third ink are identical, the third ink is a clear ink, and the second ink is an ultraviolet-curable ink.

Furthermore, regarding an ink set that has excellent curing property and can produce images having excellent flexibility, scratch resistance and solvent resistance, there is known an ink set including at least an ink composition A, which includes (a-1) polymerization initiator and (b-1) polymerizable compounds, while the proportion of monofunctional polymerizable compounds in the total weight of (b-1) polymerizable compounds is 65% by weight or more; and an ink composition B, which includes (a-2) polymerization initiator and (b-2) polymerizable compounds, while the proportion of polyfunctional polymerizable compounds in the total weight of (b-2) polymerizable compounds is 50% by weight or more (see, for example, JP2009-221416A).

In regard to an ultraviolet-curable type inkjet recording method using a two-liquid ink composition, as an inkjet recording method in which inconvenience in image formation caused by the fact that the viscosities of the two liquids are different from each other does not occur, there is known an inkjet recording method of performing printing using an ink composition set composed of an ink composition A containing at least a coloring material and polymerizable compounds; and an ink composition B containing at least a photopolymerization initiator and polymerizable compounds, by attaching the ink composition A and the ink composition B onto a recording medium, and then irradiating the ink compositions with ultraviolet ray, wherein the polymerizable compounds included in the ink composition A include a monofunctional monomer and a bifunctional monomer, and the polymerizable compounds included in the ink composition B include a monofunctional monomer, a bifunctional monomer, and a polyfunctional monomer and/or oligomer (see, for example, JP2006-123542A).

Furthermore, regarding an inkjet recording method that can effectively suppress the occurrence of offset even in a case in which high-speed image forming is carried out, there is known an inkjet recording method comprising (a) a step of jetting an ink composition containing a coloring material and a radical photopolymerization initiator onto a recording medium using an inkjet head and forming an image thereon; (b) a step of applying a treatment liquid containing polymerizable resin microparticles and a radical polymerizable monomer on the recording medium in a part where the image is formed; and (c) a step of performing light irradiation on the part where the treatment liquid has been applied on the recording medium and forming a protective film on the surface of the image (see, for example, JP2010-46844A).

Regarding a two-liquid type photocurable ink composition set having superior curing property and fixability, there is known a two-liquid type photocurable ink composition set comprising an ink composition A that includes at least a photoradical polymerization initiator and a radical polymerizable compound but does not include a coloring material; and an ink composition B that includes at least a coloring material and a radical polymerizable compound but does not include a photoradical polymerization initiator, wherein any one or both of the ink compositions include a resin emulsion dispersed in the radical polymerizable compound (see, for example, JP2008-174713A).

SUMMARY OF THE INVENTION

In regard to images formed using inks, there may be occasions in which it is required to enhance flexibility, alcohol resistance, and abrasion resistance (for example, in a case in which decorative printing is provided on a soft substrate such as leather by means of inks).

Here, flexibility of an image means that in a case in which a substrate having an image formed thereon is bent, the ease of the image to conform to the bend of the substrate. If an image has poor flexibility, in a case in which the substrate having the image formed thereon is bent, the image cannot conform to the bend of the substrate, and cracking of the image is likely to occur. This cracking of the image (that is, decrease in the flexibility of the image) is prone to occur particularly in images formed by using photocurable inks.

In images formed by the inkjet technology described in WO2014188209A, the alcohol resistance and abrasion resistance of the images may be insufficient.

Furthermore, in a method of laminating a plurality of ink layers including an ink layer formed by using an ultraviolet-curable ink, as in the case of the inkjet printing method described in JP2015-74120A, the interfacial adhesiveness between a plurality of the ink layers may be insufficient, and flexibility of the image may deteriorate.

In a case in which an image is formed using two or more kinds of inks including an ink containing a low molecular weight monomer (for example, a monofunctional monomer) as a main component as in the case of the technologies described in JP2009-221416A and JP2006-123542A, the flexibility of the ink layer originating from the ink containing a low molecular weight monomer (for example, a monofunctional monomer) as a main component may deteriorate, and as a result, the overall flexibility of the image may be impaired.

Furthermore, in a case in which an image is formed using two or more kinds of inks including an ink that contains a resin and a polymerizable compound as in the case of the technologies described in JP2010-46844A and JP2008-174713A, the interfacial adhesiveness between a plurality of ink layers may be insufficient, and flexibility of the image may deteriorate.

The present disclosure was achieved in view of the problems described above, and it is an object of the invention to achieve the following purpose.

That is, the purpose of the present disclosure is to provide an ink set capable of forming an image having excellent abrasion resistance, alcohol resistance, and flexibility, and an image forming method using this ink set.

The means for solving the problems described above include the following embodiments.

<1> An ink set, comprising:
a colored ink including an organic solvent A1, a polymer C1 that does not have a polymerizable group, and a colorant, the colored ink including the organic solvent A1 at a content of 30% by mass or more with respect to the total amount of the colored ink; and
a clear ink including an organic solvent A2 and a bifunctional or higher-functional (meth)acrylate compound X2 having a weight average molecular weight of 1,000 to 30,000, the clear ink including the organic solvent A2 at a content of 30% by mass or more with respect to the total amount of the clear ink and including the (meth)acrylate compound X2 at a content of 5% by mass or more with respect to the total amount of the clear ink,
wherein the solubility at 25° C. of the polymer C1 in the organic solvent A2 is 10% by mass or higher.

<2> The ink set according to <1>, wherein the colored ink further includes a bifunctional or higher-functional (meth)acrylate compound X1 having a weight average molecular weight of 1,000 to 30,000.

<3> The ink set according to <2>, wherein the content of the (meth)acrylate compound X2 in the clear ink is larger than the content of the (meth)acrylate compound X1 in the colored ink, and
the average number of functional groups of the (meth)acrylate compound X2 in the clear ink is larger than the average number of functional groups of the (meth)acrylate compound X1 in the colored ink.

<4> The ink set according to <2> or <3>, wherein the content of the (meth)acrylate compound X1 with respect to the total amount of the colored ink is 1% by mass or more.

<5> The ink set according to any one of <2> to <4>, wherein in the colored ink, the content of the polymer C1 with respect to the total amount of the polymer C1 and the (meth)acrylate compound X1 is 15% by mass to 50% by mass.

<6> The ink set according to any one of <1> to <5>, wherein the content of the polymer C1 in the colored ink is 1% by mass to 10% by mass with respect to the total amount of the colored ink.

<7> The ink set according to any one of <1> to <6>, wherein the weight average molecular weight of the polymer C1 is 3,000 to 200,000.

<8> The ink set according to any one of <1> to <7>, wherein the polymer C1 is a vinyl chloride-based resin.

<9> The ink set according to any one of <1> to <8>, wherein the clear ink further includes a (meth)acrylic-modified polyorganosiloxane.

<10> The ink set according to any one of <1> to <9>, wherein the colored ink is a colored inkjet ink, and the clear ink is a clear inkjet ink.

<11> The ink set according to any one of <1> to <10>, wherein the proportion occupied by at least one compound selected from the group consisting of a glycol ether, an organic carbonate, and an ester in the organic solvent A1 is 80% by mass to 100% by mass, and the proportion occupied by at least one compound selected from the group consisting of a glycol ether, an organic carbonate, and an ester in the organic solvent A2 is 80% by mass to 100% by mass.

<12> The ink set according to any one of <1> to <11>, wherein the proportion occupied by a compound having a boiling point of 150° C. to 250° C. in the organic solvent A1 is 80% by mass to 100% by mass, and the proportion occupied by a compound having a boiling point of 150° C. to 250° C. in the organic solvent A2 is 80% by mass to 100% by mass.

<13> The ink set according to any one of <1> to <12>, wherein the solubility at 25° C. of the polymer C1 in the organic solvent A1 is 10% by mass or higher.

<14> An image forming method by using the ink set according to any one of <1> to <13>, the method comprising:
a colored image forming step of applying the colored ink on a substrate and thereby forming a colored image; and
a clear image forming step of applying the clear ink at least on the colored image, irradiating the applied clear ink with active energy ray, and thereby forming a clear image at least on the colored image.

According to the present disclosure, an ink set that can form an image having excellent abrasion resistance, alcohol resistance, and flexibility, and an image forming method by using this ink set are provided.

DESCRIPTION OF THE PREFERRED EMBODIMENTS

Hereinafter, specific embodiments of the present disclosure will be described in detail; however, the present disclosure is not intended to be limited to the following embodiments.

According to the present specification, a numerical value range indicated by using the symbol "~" represents a range including the values described before and after the symbol "~" as the minimum value and the maximum value, respectively.

According to the present specification, unless particularly stated otherwise, the amount of each component in the composition means, in a case in which a plurality of substances corresponding to each component exists in the composition, the total amount of a plurality of the substances existing in the composition.

According to the present specification, the term "step" includes not only independent steps but also a step that is not clearly distinguishable from other steps but is capable of achieving a predetermined purpose of that step.

According to the present specification, the term "light" is a concept including active energy ray such as γ-ray, β-ray, electron beam, ultraviolet ray, visible light, and infrared radiation.

In the present specification, ultraviolet ray may be referred to as "UV (Ultra Violet)".

According to the present specification, the term "(meth) acryl" is a concept including both acryl and methacryl, the term "(meth)acrylate" is a concept including both acrylate and methacrylate, and the term "(meth)acryloyl group" is a concept including both acryloyl group and methacryloyl group.

[Ink Set]

The ink set of the present disclosure comprises a colored ink as described below and a clear ink as described below.

The colored ink is a colored ink including an organic solvent A1, a polymer C1 that does not have a polymerizable group, and a colorant, and the content of the organic solvent A1 with respect to the total amount of the colored ink is 30% by mass or more.

The clear ink is a clear ink including an organic solvent A2 and a bifunctional or higher-functional (meth)acrylate compound X2 having a weight average molecular weight of 1,000 to 30,000, and the content of the organic solvent A2 with respect to the total amount of the clear ink is 30% by mass or more, while the content of the (meth)acrylate compound X2 with respect to the total amount of the clear ink is 5% by mass or more.

In regard to the ink set of the present disclosure, the solubility at 25° C. of the polymer C1 with respect to the organic solvent A2 is 10% by mass or higher.

By using the ink set of the present disclosure, an image having excellent abrasion resistance, alcohol resistance, and flexibility can be formed.

In the present specification, the term "image" as used to simply state "the image" means, unless particularly stated otherwise, a clear image-attached colored image (hereinafter, also referred to as "overcoat film-attached colored image") having a structure in which a colored image formed by the colored ink is coated with a clear image formed by the clear ink (hereinafter, also referred to as "overcoat film").

The reason why the above-described effects are provided by the ink set of the present disclosure is speculated as follows.

The clear ink in the ink set of the present disclosure includes a (meth)acrylate compound X2 as a polymerizable compound. Therefore, a clear image having high image strength can be formed by applying the clear ink on a colored image or a substrate and irradiating the clear ink with light.

Accordingly, in a case in which the ink set of the present disclosure is used, the colored ink is applied on a substrate to form a colored image, the clear ink is applied on the colored image thus formed so as to form a clear image, and thereby the colored image can be coated with the clear image (overcoat film) having high image strength. Therefore, an overcoat film-attached colored image having excellent abrasion resistance can be formed by using the ink set of the present disclosure.

In the ink set of the present disclosure, since the weight average molecular weight of the (meth)acrylate compound X2 is 1,000 or more, and the content of the (meth)acrylate compound X2 with respect to the total amount of the clear ink is 5% by mass or more, flexibility of the clear image is enhanced.

Therefore, by using the ink set of the present disclosure, a colored image can be coated with a clear image (overcoat film) having high flexibility. Accordingly, an overcoat film-attached colored image having excellent flexibility can be formed by using the ink set of the present disclosure.

In the ink set of the present disclosure, the colored ink includes a polymer C1, the content of the organic solvent A2 with respect to the total amount of the clear ink is 30% by mass or more, and the solubility at 25° C. (hereinafter, also simply referred to as "solubility") of the polymer C1 in the organic solvent A2 in the clear ink is 10% by mass or higher. These configurations cause the interfacial adhesiveness between the colored image and the overcoat film to increase. The reason for this is not clearly understood; however, it is speculated that at the time of applying the clear ink that includes the organic solvent A2 in an amount of 30% by mass or more is applied on the colored image, the polymer C1 in the colored image is swollen by the organic solvent A2 in the clear ink, and as a result, the interfacial adhesiveness between the colored image and the overcoat film is enhanced.

In the ink set of the present disclosure, as the interfacial adhesiveness between the colored image and the overcoat film is enhanced, the flexibility of the overcoat film-attached colored image is increased. That is, a decrease in the flexibility of the overcoat film-attached colored image, which is attributed to deterioration of the interfacial adhesiveness between the colored image and the overcoat film, is suppressed.

It is also speculated that the fact that the content of the organic solvent A1 with respect to the total amount of the colored ink is 30% by mass or more also contributes to the flexibility of the overcoat film-attached colored image. More particularly, it is thought that since the content of the organic solvent A1 with respect to the total amount of the colored ink is 30% by mass or more, the thickness of the layer formed by the colored ink (colored image) is reduced. As a result, it is speculated that a decrease in the flexibility of the overcoat film-attached colored image, which is caused by the thickness of the colored image being too thick, is suppressed.

In the ink set of the present disclosure, since the colored ink includes a polymer C1, and the content of the (meth)acrylate compound X2 with respect to the total amount of the clear ink is 5% by mass or more, the alcohol resistance of the overcoat film-attached colored image is increased.

Furthermore, it is thought that the fact that the content of the organic solvent A1 with respect to the total amount of the colored ink is 30% by mass or more, also contributes to the alcohol resistance of the overcoat film-attached colored image. More particularly, it is speculated that by having the content of the organic solvent A1 with respect to the total amount of the colored ink adjusted to be 30% by mass or more, the proportion of the polymer C1 in the solid content of the colored ink can be secured to be high to a certain extent, and as a result, the function of the polymer C1 (function of enhancing alcohol resistance) can be exhibited effectively.

Due to the reasons described above, an image (overcoat film-attached colored image) having excellent abrasion resistance, alcohol resistance, and flexibility can be formed by using the ink set of the present disclosure. However, the present disclosure is not intended to be limited due to the reasons described above.

In the present specification, a clear ink refers to an ink that substantially does not include a colorant.

Here, the phrase "substantially does not include a colorant" means that the content of a colorant in the ink is less than 0.5% by mass (more preferably less than 0.1% by mass, and particularly preferably 0% by mass).

In the present specification, the "solubility at 25° C." means the concentration (mass %) of the solute in a saturated solution at 25° C.

The solubility at 25° C. of the polymer C1 in the organic solvent A2 is 10% by mass or higher. Thereby, the interfacial adhesiveness between the overcoat film and the colored image is enhanced as described above, and as a result, the flexibility of the overcoat film-attached colored image is increased.

The solubility at 25° C. of the polymer C1 in the organic solvent A2 is preferably 20% by mass or higher, from the viewpoint of further enhancing the flexibility of the overcoat film-attached colored image.

There are no particular limitations on the upper limit of the solubility at 25° C. of the polymer C1 with respect to the organic solvent A2; however, the upper limit is, for example, 80% by mass.

It is not necessarily essential that the colored ink according to the present disclosure includes a polymerizable compound.

The colored ink preferably includes a bifunctional or higher-functional (meth)acrylate compound X1 having a weight average molecular weight of 1,000 to 30,000. Thereby, the flexibility and strength of the colored image are further enhanced, and as a result, the flexibility and alcohol resistance of the overcoat film-attached colored image are further enhanced.

In a case in which the colored ink includes the (meth)acrylate compound X1, it is preferable that the content of the (meth)acrylate compound X2 in the clear ink is larger than the content of the (meth)acrylate compound X1 in the colored ink.

That is, in a case in which the colored ink includes the (meth)acrylate compound X1, it is preferable that the content (mass %) of the (meth)acrylate compound X2 with respect to the total amount of the clear ink is larger than the content (mass %) of the (meth)acrylate compound X1 with respect to the total amount of the colored ink.

The alcohol resistance of the overcoat film-attached colored image is further enhanced thereby.

The difference [X2 amount−X1 amount] between the content of the (meth)acrylate compound X2 (mass %; hereinafter, also referred to as "X2 amount") with respect to the total amount of the clear ink and the content of the (meth)acrylate compound X1 (mass %; hereinafter, also referred to as "X1 amount") with respect to the total amount of the colored ink is preferably 3 or greater, more preferably 4 or greater, and particularly preferably 6 or greater, from the viewpoint of further enhancing the alcohol resistance of the overcoat film-attached colored image.

There are no particular limitations on the upper limit of the difference [X2 amount−X1 amount]; however, the upper limit is, for example, 30, and preferably 25.

In a case in which the colored ink includes the (meth)acrylate compound X1, it is preferable that the average number of functional groups of the (meth)acrylate compound X2 in the clear ink is larger than the average number of functional groups of the (meth)acrylate compound X1 in the colored ink.

The alcohol resistance of the overcoat film-attached colored image is further enhanced thereby.

In a case in which the colored ink includes the (meth)acrylate compound X1, from the viewpoint of further enhancing the alcohol resistance of the overcoat film-attached colored image, it is preferable that the content of the (meth)acrylate compound X2 in the clear ink is larger than the content of the (meth)acrylate compound X1 in the colored ink, and the average number of functional groups of the (meth)acrylate compound X2 in the clear ink is larger than the average number of functional groups of the (meth)acrylate compound X1 in the colored ink.

Here, the average number of functional groups of (meth)acrylate compounds X2 in the clear ink refers to the value that can be determined by the following formula.

Average number of functional groups of (meth)acrylate compounds $X2$ in clear ink=$\Sigma$(number of functional groups of each (meth)acrylate compound $X2$ included in clear ink×content of each (meth)acrylate compound $X2$ in clear ink)total content of (meth)acrylate compounds $X2$ included in clear ink For example, in a case in which a (meth)acrylate compound X2 having a functionality of a is included in the clear ink at a proportion of x % by mass with respect to the total amount of the clear ink, a (meth)acrylate compound X2 having a functionality of b is included in the clear ink at a proportion of y % by mass with respect to the total amount of the clear ink, and a (meth)acrylate compound X2 having a functionality of c is included at a proportion of z % by mass, the average number of functional groups of the (meth)acrylate compounds X2 in the clear ink is a value that is determined by the calculation formula: "(ax+by+cz)(x+y+z)".

In a case in which the colored ink includes the (meth)acrylate compound X1, the average number of functional groups of the (meth)acrylate compound X1 in the colored ink is also determined similarly to the average number of functional groups of the (meth)acrylate compound X2 in the clear ink.

In a case in which the colored ink includes the (meth)acrylate compound X1, the difference between the average number of functional groups of the (meth)acrylate compound X2 in the clear ink and the average number of functional groups of the (meth)acrylate compound X1 in the colored ink [average number of functional groups of (meth)acrylate compound X2 in clear ink−average number of functional groups of (meth)acrylate compound X1 in colored ink] is desirably larger than 0; however, from the viewpoint of alcohol resistance of the image, the difference is preferably 0.40 or greater, and more preferably 0.60 or greater.

There are no particular limitations on the upper limit of the difference described above; however, the upper limit may be 7.00, and the upper limit is preferably 6.00, more preferably 5.00, and particularly preferably 4.00.

In a case in which the colored ink includes the (meth)acrylate compound X1, the average number of functional groups of the (meth)acrylate compound X1 in the colored ink is not particularly limited; however, the average number of functional groups is preferably 2.00 to 4.00, more preferably 2.00 to 3.00, even more preferably 2.00 to 2.50, still more preferably 2.00 to 2.30, and particularly preferably 2.00 to 2.10.

The average number of functional groups of the (meth)acrylate compound X2 in the clear ink is preferably more than 2.00 and 6.00 or less, more preferably 2.20 to 6.00, even more preferably 2.50 to 6.00, and particularly preferably 2.50 to 5.00.

As described above, the content of the organic solvent A1 with respect to the total amount of the colored ink is 30% by mass or more.

As described above, the fact that the content of the organic solvent A1 with respect to the total amount of the colored ink is 30% by mass or more contributes to an increase in the flexibility and an increase in the alcohol resistance of the overcoat film-attached colored image.

In a case in which the content of the organic solvent A1 with respect to the total amount of the colored ink is 30% by mass or more, the colored ink has a fluidity that is appropriate for a use application of forming a colored image by applying the colored ink on a substrate. For example, in a case in which the colored ink is a colored inkjet ink, jetting stability from the inkjet head (hereinafter, also simply referred to as "jetting stability") is secured. Even in a case in which the colored ink is a colored ink other than a colored inkjet ink (for example, a colored ink for coating), the colored ink can be easily applied on a substrate.

The content of the organic solvent A1 with respect to the total amount of the colored ink is preferably 40% by mass or more, more preferably 50% by mass or more and particularly preferably 60% by mass or more, from the viewpoint of further increasing the fluidity of the colored ink (jetting stability in the case of a colored inkjet ink).

The upper limit of the content of the organic solvent A1 with respect to the total amount of the colored ink is set as appropriate by the relations with the contents of other components. The upper limit of the content of the organic solvent A1 in the colored ink is, for example, 90% by mass.

The content of the organic solvent A2 with respect to the total amount of the clear ink is 30% by mass or more.

As described above, the fact that the content of the organic solvent A2 with respect to the total amount of the clear ink is 30% by mass or more contributes to the swelling of the polymer C1 at the time of applying the clear ink on the colored image, and to an increase in the flexibility of the overcoat film-attached colored image caused by this swelling.

Since the content of the organic solvent A2 with respect to the total amount of the clear ink is 30% by mass or more, the clear ink has a fluidity that is appropriate for a use application of forming a clear image by applying the clear ink on a substrate (for example, on the colored image formed on a substrate). For example, in a case in which the clear ink is a clear inkjet ink, jetting stability from the inkjet head (hereinafter, also simply referred to as "jetting stability") is secured. Even in a case in which the clear ink is a clear ink other than a clear inkjet ink (for example, a clear ink for coating), the clear ink can be easily applied on a substrate (for example, on a colored image formed on a substrate).

From the viewpoint of further enhancing the flexibility of the overcoat film-attached colored image and further increasing fluidity of the clear ink (in the case of a clear inkjet ink, jetting stability), the content of the organic solvent A2 in the clear ink is preferably 40% by mass or more, more preferably 50% by mass or more, and particularly preferably 60% by mass or more, with respect to the total amount of the clear ink.

The upper limit of the content of the organic solvent A2 in the clear ink is set as appropriate by the relations with the contents of other components. The upper limit of the content of the organic solvent A2 in the clear ink is, for example, 90% by mass. As described above, the ink set of the present disclosure comprises a colored ink and a clear ink.

The ink set of the present disclosure may comprise only one kind of colored ink, or may comprise two or more kinds of colored inks.

Further, the ink set of the present disclosure may comprise only one kind of clear ink, or may comprise two or more kinds of clear inks.

Hereinafter, first, the substrate as an object of image formation by the ink set of the present disclosure will be explained, and subsequently, the colored ink and the clear ink in the ink set of the present disclosure will be explained in more detail.

<Substrate>

The ink set of the present disclosure is used for a use application of forming an image (overcoat film-attached colored image) on a substrate.

As described above, an image having excellent abrasion resistance, alcohol resistance, and flexibility can be formed by using the ink set of the present disclosure. Therefore, the ink set of the present disclosure is especially suitable for a use application of forming an image on a soft substrate as a substrate, for example, for a use application in decorative printing (preferably according to an inkjet method) on leather products (for example, seat sheets for vehicles, bags, shoes, and wallets) as substrates.

However, the ink set of the present disclosure is not limited to the use applications described above and can also be used for general image formation on general substrates such as paper and plastic films. The plastic films may be films produced into an electrostatic flocked substrate, a flock processed substrate, a velour-like substrate, a velvet-like substrate, and a suede-like substrate, by means of surface processing.

Regarding the substrate, a soft substrate is preferred as described above.

Specific examples of the soft substrate include leather, cloth, and a plastic film. Among them, leather is preferred.

Examples of the leather include natural leather (also called "real leather") and synthetic leathers (for example, PVC (polyvinyl chloride) leather and PU (polyurethane) leather). In regard to the leather, for example, the description in paragraph 0163 to paragraph 0165 of JP2009-058750A can be referred to.

<Colored Ink>

The colored ink includes an organic solvent A1, a polymer C1 that does not have a polymerizable group, and a colorant, and the content of the organic solvent A1 with respect to the total amount of the colored ink is 30% by mass or more.

(Organic Solvent A1)

The colored ink includes at least one organic solvent A1.

A preferred range of the content of the organic solvent A1 with respect to the total amount of the colored ink is as described above.

The organic solvent A1 is not particularly limited and can be selected from any arbitrary organic solvent that is generally used in printing industry.

Examples of the organic solvent A1 include glycol ethers, alcohols, ketones, esters, pyrrolidones, and organic carbonates.

Examples of the glycol ethers include ethylene glycol monomethyl ether, diethylene glycol diethyl ether, diethylene glycol butyl methyl ether, and triethylene glycol monobutyl ether.

Examples of the ketones include methyl ethyl ketone.

Examples of the esters include chain-like esters and cyclic esters (lactones).

Examples of the chain-like esters include 3-methoxybutyl acetate and ethylene glycol monomethyl ether acetate.

Examples of the cyclic esters (lactones) include γ-butyrolactone.

Examples of the pyrrolidones include N-methyl-2-pyrrolidone.

Examples of the organic carbonates include propylene carbonate.

The organic solvent A1 is preferably a glycol ether, an organic carbonate, or an ester, and more preferred examples include diethylene glycol diethyl ether, ethylene glycol monomethyl ether, 3-methoxybutyl acetate, and γ-butyrolactone, while particularly preferred examples include diethylene glycol diethyl ether, ethylene glycol monomethyl ether, and 3-methoxybutyl acetate.

From the viewpoint of optimization of the viscosity of the colored ink (and increase in the jetting stability in the case of a colored inkjet ink), the proportion occupied by at least one compound selected from the group consisting of a glycol ether, an organic carbonate, and an ester in the organic solvent A1 is preferably 80% by mass to 100% by mass (more preferably 90% by mass to 100% by mass, even more preferably 95% by mass to 100% by mass, and most preferably 100% by mass).

The boiling point of the organic solvent A1 is preferably 75° C. to 300° C., and more preferably 100° C. to 250° C.

In a case in which the boiling point of the organic solvent A1 is 75° C. or higher, the adhesiveness of the image is further increased. Meanwhile, in a case in which the boiling point of the organic solvent A1 is 300° C. or lower, bleeding of the image is further suppressed.

The boiling point of the organic solvent A1 is preferably 140° C. to 250° C., more preferably 150° C. to 250° C., and particularly preferably 150° C. to 200° C.

In a case in which the boiling point of the organic solvent A1 is 140° C. or higher, it is advantageous from the viewpoint of optimization of the viscosity of the colored ink (and increase in the jetting stability in the case of a colored inkjet ink).

In a case in which the boiling point of the organic solvent A1 is 250° C. or lower, it is advantageous from the viewpoint of the scratch resistance of the image.

The boiling point according to the present specification means the boiling point at 1 atmosphere (101325 Pa).

From the viewpoints of optimization of the viscosity of the colored ink (and jetting stability in the case of the colored inkjet ink) and the scratch resistance of the image, the proportion occupied by a compound having a boiling point of 140° C. to 250° C. (more preferably a boiling point of 150° C. to 250° C., and even more preferably a boiling point of 150° C. to 200° C.) in the organic solvent A1 is preferably 80% by mass to 100% by mass (more preferably 90% by mass to 100% by mass, even more preferably 95% by mass to 100% by mass, and most preferably 100% by mass).

((Meth)acrylate Compound X1)

Regarding the colored ink, it is not essential that the colored ink includes a polymerizable compound; however, it is preferable that the colored ink includes at least one bifunctional or higher-functional (meth)acrylate compound X1 having a weight average molecular weight of 1,000 to 30,000. Flexibility and alcohol resistance of the image are further enhanced thereby.

Here, the term "bifunctional or higher-functional" means having two or more polymerizable groups in one molecule.

From the viewpoint of further enhancing the flexibility of the image, the (meth)acrylate compound X1 is preferably a bifunctional to hexafunctional (meth)acrylate compound, more preferably a bifunctional to tetrafunctional (meth)acrylate compound, even more preferably a bifunctional to trifunctional (meth)acrylate compound, and particularly preferably a bifunctional (meth)acrylate compound.

Furthermore, the (meth)acrylate compound X1 is preferably urethane (meth)acrylate, bisphenol A epoxy (meth)acrylate, or epoxy novolac (meth)acrylate; and particularly preferably urethane (meth)acrylate.

Regarding the (meth)acrylate compound X1, a commercially available product may be used, and examples of the commercially available product include oligomers such as CN996 (bifunctional oligomer, urethane acrylate, weight average molecular weight (Mw)=2,850) of Sartomer Company, Inc.; UA-122P (bifunctional oligomer, urethane acrylate, Mw=1,100) of Shin Nakamura Chemical Co., Ltd.; SHIKOH (registered trademark) UV-6630B (bifunctional oligomer, urethane acrylate, Mw=3,000), SHIKOH (registered trademark) UV-3310B (bifunctional oligomer, urethane acrylate, Mw=5,000), and SHIKOH (registered trademark) UV-7630B (hexafunctional oligomer, urethane acrylate, Mw=2,200) of Nippon Synthetic Chemical Industry Co., Ltd.

The weight average molecular weight (Mw) of the (meth)acrylate compound X1 is preferably 1,500 to 15,000, more preferably 2,000 to 10,000, and particularly preferably 2,000 to 7,000, from the viewpoints of optimization of the viscosity of the colored ink (and jetting stability in the case of a colored inkjet ink).

In the present specification, the weight average molecular weight means a value measured by gel permeation chromatography (GPC).

This GPC is carried out using HLC-8020GPC (manufactured by Tosoh Corp.), using three units of TSKgel (registered trademark), Super Multipore HZ-H (manufactured by Tosoh Corp., 4.6 mm ID×15 cm) as columns, and using THF (tetrahydrofuran) as an eluent.

GPC Is carried out by setting the sample concentration to 0.45% by mass, the flow rate to 0.35 ml/min, the sample injection amount to 10 μl, and the measurement temperature to 40° C., using a differential refractive index (RI) detector.

The calibration curve is produced from eight samples of "Standard Samples TSK standard, polystyrene": "F-40", "F-20", "F-4", "F-1", "A-5000", "A-2500", "A-1000", and "n-propylbenzene".

In a case in which the colored ink includes the (meth)acrylate compound X1, the content of the (meth)acrylate compound X1 with respect to the total amount of the colored ink is preferably 1% by mass or more, more preferably 1% by mass to 40% by mass, even more preferably 1% by mass to 20% by mass, and particularly preferably 2% by mass to 15% by mass.

In a case in which the content of the (meth)acrylate compound X1 in the colored ink is 1% by mass or more, the flexibility and alcohol resistance of the image are further enhanced.

In a case in which the content of the (meth)acrylate compound X1 in the colored ink is 40% by mass or less, there is a tendency that the colored ink can be more easily applied.

(Other polymerizable Compounds)

The colored ink in the ink set of the present disclosure may include a polymerizable compound other than the (meth)acrylate compound X1, for example, a polymerizable compound having a weight average molecular weight of less than 1,000, to the extent that the effects of the present disclosure are not impaired.

However, from the viewpoint of the flexibility of the image, the content of the monofunctional polymerizable compound with respect to the total amount of the polymerizable compounds included in the colored ink (hereinafter, also simply referred to as "polymerizable compounds B1") is preferably 90% by mass or less, more preferably 70% by mass or less, even more preferably 50% by mass or less, still more preferably 40% by mass or less, even more preferably 20% by mass or less, and particularly preferably 10% by mass or less.

Furthermore, from the viewpoint of the flexibility of the image, the content of the polymerizable compound having a weight average molecular weight of less than 1,000 with respect to the total amount of the colored ink is preferably 40% by mass or less, more preferably 30% by mass or less, even more preferably 20% by mass or less, still more preferably 10% by mass or less, and particularly preferably 5% by mass or less.

Examples of the monofunctional polymerizable compound include monofunctional (meth)acrylate monomers such as phenoxyethyl acrylate (PEA), cyclic TMP formal acrylate (CTFA), isobornyl acrylate (IBOA), tetrahydrofurfuryl acrylate (THFA), 2-(2-ethoxyethoxy)ethyl acrylate, octadecyl acrylate (ODA), tridecyl acrylate (TDA), isodecyl acrylate (IDA), and lauryl acrylate.

Examples of the polyfunctional polymerizable compound having a weight average molecular weight of less than 1,000 include polyfunctional (meth)acrylate monomers such as hexanediol diacrylate, trimethylolpropane triacrylate, pentaerythritol triacrylate, polyethylene glycol diacrylate (for example, tetraethylene glycol diacrylate), dipropylene glycol diacrylate, tri(propylene glycol) triacrylate, neopentyl glycol diacrylate, bis(pentaerythritol) hexaacrylate, an ethoxylated or propoxylated glycol diacrylate (for example, propoxylated neopentyl glycol diacrylate), ethoxylated or propoxylated polyol polyacrylate (for example, ethoxylated trimethylolpropane triacrylate), and a mixture of an ethoxylated or propoxylated glycol diacrylate and an ethoxylated or propoxylated polyol polyacrylate.

Furthermore, examples of other polymerizable compounds (that is, polymerizable compounds other than (meth) acrylate compound X1) include vinyl ether monomers such as triethylene glycol divinyl ether, diethylene glycol divinyl ether, 1,4-cyclohexanedimethanol divinyl ether, and ethylene glycol monovinyl ether;

N-vinylamides such as N-vinylcaprolactam (NVC) and N-vinylpyrrolidone (NVP); and N-(meth)acryloylamines such as N-acryloylmorpholine (ACMO).

In a case in which the colored ink includes a polymerizable compound, the content of the polymerizable compound is preferably 1% by mass to 60% by mass, more preferably 1% by mass to 50% by mass, even more preferably 1.5% by mass to 30% by mass, and particularly preferably 2% by mass to 20% by mass, with respect to the total amount of the colored ink.

(Polymer C1 that does not have Polymerizable Group)

The colored ink includes at least one polymer C1 that does not have a polymerizable group.

The alcohol resistance of the image is enhanced thereby.

Examples of the polymer C1 include an epoxy resin, a vinyl chloride-based resin, a vinyl acetate-based resin, a polyester, a (meth)acrylic resin, a chlorinated polyolefin, and a polyketone.

The polymer C1 is preferably a vinyl chloride-based resin, a polyester, or a (meth)acrylic resin, from the viewpoints of the flexibility of the image and the alcohol resistance of the image.

Among them, from the viewpoint of further enhancing the alcohol resistance of the image, a vinyl chloride-based resin is particularly preferred.

Here, a vinyl chloride-based resin means a polymer containing a structural unit derived from vinyl chloride.

Examples of the vinyl chloride-based resin include a homopolymer of vinyl chloride (that is, polyvinyl chloride), a copolymer of vinyl chloride and vinyl acetate (hereinafter, also referred to as "vinyl chloride-vinyl acetate copolymer"), and a copolymer of vinyl chloride and hydroxyacrylate (hereinafter, also referred to as "vinyl chloride-hydroxyacrylate copolymer").

The content of the structural unit derived from vinyl chloride in the vinyl chloride-based resin is preferably 50% by mass or more, more preferably 60% by mass or more, even more preferably 70% by mass or more, and particularly preferably 80% by mass or more.

Examples of a commercially available product of the vinyl chloride-based resin include UCAR solution vinyl resins VYHD, VYHH, VMCA, VROH, and VYLF-X manufactured by Dow Chemical Company; SOLBIN resins CL, CNL, CSR, and TA5R manufactured by Nissin Chemical Industry Co., Ltd.; VINNOL (registered trademark) E1540, E1545, H1436, H1542, H1550, H1159, H4043, H4050, H4055, H4060, H1545M, E1545M, and E1540A manufactured by Wacker Chemie AG.

Examples of the (meth)acrylic resin include a copolymer of methyl methacrylate and n-butyl methacrylate.

Examples of a commercially available product of the (meth)acrylic resin include ELVACITE 2013 (copolymer of methyl methacrylate and n-butyl methacrylate, Mw=34,000), ELVACITE 2014 (copolymer of methyl methacrylate and n-butyl methacrylate, Mw=119,000), and ELVACITE 4099 (copolymer of methyl methacrylate and n-butyl methacrylate, Mw=15,000) of Lucite International, Inc.; and DIANAL (registered trademark) BR-113 (butyl methacrylate resin, Mw=30,000) of Mitsubishi Rayon Co., Ltd.

Examples of a commercially available product of the polyester include polyester resins of Evonik Japan Co., Ltd. ("TEGO (registered trademark) addbond LTH"; Mw=3,000).

Examples of a commercially available product of the chlorinated polyolefin include SUPERCHLON (registered trademark) 814HS of Nippon Paper Group, and examples of a commercially available product of the polyketone include TEGO (registered trademark) VARIPLUS AP, CA, and SK of Evonik Industries AG.

The weight average molecular weight (Mw) of the polymer C1 is preferably 3,000 to 200,000, more preferably 5,000 to 200,000, even more preferably 10,000 to 150,000, still more preferably 10,000 to 100,000, and particularly preferably 10,000 to 50,000.

In a case in which the Mw of the polymer C1 is 3,000 or more, the alcohol resistance and flexibility of the image are further enhanced.

In a case in which the Mw of the polymer C1 is 200,000 or less, the viscosity of the colored ink is reduced, and handleability of the colored ink is further enhanced (for example, in a case in which the colored ink is a colored inkjet ink, the jetting stability of the colored ink is further increased).

The content of the polymer C1 in the colored ink is preferably 1% by mass to 10% by mass, more preferably 1.5% by mass to 10% by mass, and particularly preferably 2% by mass to 6% by mass, with respect to the total amount of the colored ink.

In a case in which the content of the polymer C1 with respect to the total amount of the colored ink is 1% by mass or more, the alcohol resistance and flexibility of the image are further enhanced.

In a case in which the content of the polymer C1 with respect to the total amount of the colored ink is 10% by mass or less, the viscosity of the colored ink is reduced, and handleability of the colored ink is further enhanced (for example, in a case in which the colored ink is a colored inkjet ink, the jetting stability of the colored ink is further increased).

In regard to the colored ink, the content of the polymer C1 with respect to the total amount of the polymer C1 and the (meth)acrylate compound X1 is preferably 10% by mass to 60% by mass, more preferably 14% by mass to 50% by mass, and particularly preferably 15% by mass to 50% by mass.

In a case in which the content of the polymer C1 with respect to the total amount of the polymer C1 and the (meth)acrylate compound X1 is 10% by mass or more, the alcohol resistance and flexibility of the image are further enhanced.

In a case in which the content of the polymer C1 with respect to the total amount of the polymer C1 and the (meth)acrylate compound X1 is 60% by mass or less, the viscosity of the colored ink is reduced, and handleability of the colored ink is further enhanced (for example, in a case in which the colored ink is a colored inkjet ink, jetting stability of the colored ink is further increased).

The solubility at 25° C. of the polymer C1 in the colored ink with respect to the organic solvent A2 in the clear ink is as described above.

The solubility at 25° C. of the polymer C1 in the organic solvent A1 is preferably 5% by mass or higher, and more preferably 10% by mass or higher, from the viewpoints of the alcohol resistance of the colored image and the overcoat film-attached colored image, and optimization of the viscosity of the colored ink (and jetting stability in the case of a colored inkjet ink).

There are no particular limitations on the upper limit of the solubility at 25° C. of the polymer C1 in the organic solvent A1; however, the upper limit is, for example, 80% by mass.

(Colorant)

The colored ink includes at least one colorant.

The colorant is not particularly limited and may be a pigment or may be a dye. However, from the viewpoint of light resistance, a pigment is preferred.

The pigment is not particularly limited and can be selected as appropriate according to the purpose. It is preferable that the pigment is dispersed in the colored ink.

The pigment may be any one of an organic pigment and an inorganic pigment, or an organic pigment and an inorganic pigment may be used in combination.

Examples of the organic pigment include polycyclic pigments such as an azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, and a quinophthalone pigment; dye lakes such as a basic dye type lake and an acidic dye type lake; a nitro pigment, a nitroso pigment, aniline black, and a daylight fluorescent pigment.

Examples of the inorganic pigment include titanium oxide, iron oxide, calcium carbonate, barium sulfate, aluminum hydroxide, barium yellow, cadmium red, chrome yellow, and carbon black.

Regarding the colorant, for example, organic pigments or inorganic pigments having the following numbers as described in the Color Index can be used.

Examples of a blue pigment or a cyan pigment include Pigment Blue 1, 15, 15:1, 15:2, 15:3, 15:4, 15:6, 16, 17-1, 22, 27, 28, 29, 36, and 60;

examples of a green pigment include Pigment Green 7, 26, 36, and 50;

examples of a red pigment or a magenta pigment include Pigment Red 3, 5, 9, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet 3, 19, 23, 29, 30, 37, 50, and 88; and Pigment Orange 13, 16, 20, and 36;

examples of a yellow pigment include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193;

examples of a black pigment include Pigment Black 7, 28, and 26; and examples of a white pigment include Pigment White 6, 18, and 21.

Even those pigments that are not described in the Color Index can also be used as appropriate according to the purpose. For example, a pigment that has been further surface-treated with a surfactant, a polymer dispersant, or the like, and graft carbon can also be used.

Examples of the polymer dispersant include a polyamidoamine and a salt thereof, a polyvalent carboxylic acid and a salt thereof, a high molecular weight unsaturated acid ester, a modified polyurethane, and a polyether ester.

Regarding the polymer dispersant, a commercially available product may be used, and examples of the commercially available product include polymer dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (all manufactured by EFKA Additives B.V.); and DISPERSE AID 6, DISPERSE AID 8, DISPERSE AID 15, and DISPERSE AID 9100 (manufactured by San Nopco, Ltd.); various SOLSPERSE dispersants (manufactured by Avicia Co., Ltd.) such as SOLSPERSE 3000, 5000, 9000, 12000, 13240, 13940, 17000, 22000, 24000, 26000, 28000, 32000, 36000, 39000, 41000, and 71000; ADEKA PLURONIC L31, F38, L42, L44, L61, L64, F68, L72, P95, F77, P84, F87, P94, L101, P103, F108, L121, and P-123 (manufactured by Adeka Corporation), IONET (registered trademark) S-20 (manufactured by Sanyo Chemical Industries, Ltd.), and DISPARLON KS-860, 873SN, and 874 (polymer dispersants), #2150 (aliphatic polyvalent carboxylic acid), and #7004 (polyether ester type)" manufactured by Kusumoto Chemicals, Ltd.

In a pigment that has been surface-treated with a polymer dispersant, the content ratio between the polymer dispersant and the pigment (polymer dispersant:pigment) is preferably 1:1 to 1:10, more preferably 1:1 to 1:5, and even more preferably 1:2 to 1:3.

Regarding the colorant, a commercially available product can be used. Examples of the commercially available product include Paliotol (BASF SE), Cinquasia, Irgalite (both Ciba Specialty Chemicals Corporation), and Hostaperm (Clariant UK, Ltd.).

Among these colorants, the cyan pigment is preferably a phthalocyanine pigment such as Phthalocyanine Blue 15:4. The yellow pigment is preferably an azo pigment such as Pigment Yellow 120, Pigment Yellow 151, or Pigment Yellow 155. The magenta pigment is preferably a quinacridone pigment, such as a mixed crystal quinacridone such as Pigment Violet 19 or Cinquasia MAGENTA L4540. The black pigment is preferably a carbon black pigment such as Pigment Black 7.

The volume average particle size of the colorant is not particularly limited; however, from the viewpoint of the jetting stability of the ink, the volume average particle size is preferably less than 8 μm, more preferably less than 5 μm, even more preferably less than 1 μm, and particularly preferably less than 0.5 μm. The lower limit of the volume average particle size of the colorant is not particularly limited; however, from the viewpoints of colorability and light resistance, the lower limit is preferably 0.001 μm or larger, and more preferably 0.01 μm or larger.

The volume average particle size can be measured using a laser diffraction particle size distribution meter (for example, MASTERSIZER 2000 manufactured by Malvern Panalytical, Ltd., or a laser diffractionscattering type particle size distribution analyzer LA-920 manufactured by Horiba, Ltd.).

The content of the colorant is more preferably 0.5% by mass or more, and particularly preferably 1% by mass or more, with respect to the total amount of the colored ink.

The upper limit of the content of the colorant is preferably 20% by mass, more preferably 10% by mass, even more preferably 8% by mass, and particularly preferably 5% by mass, with respect to the total amount of the colored ink.

(Photopolymerization Initiator)

It is preferable that the colored ink includes at least one photopolymerization initiator.

Examples of the photopolymerization initiator include radical photopolymerization initiators such as benzophenone, 1-hydroxycyclohexyl phenyl ketone, 1-[4-(2-hydroxyethoxy)-phenyl]-2-hydroxy-2-methyl-1-propan-1-one, 2-benzyl-2-dimethylamino-(4-morpholinophenyl) butan-1-one, isopropylthioxanthone, benzyl dimethyl ketal, bis(2,4,6-trimethylbenzoyl)-phenylphosphine oxide, and bis(2,6-dimethylbenzoyl)-2,4,4-trimethylpentylphosphine oxide.

These radical photopolymerization initiators are known. Examples of commercially available products of these radical photopolymerization initiators include IRGACURE (registered trademark), DAROCUR (registered trademark), and LUCIRIN (registered trademark) (all manufactured by BASF SE).

The content of the photopolymerization initiator in the colored ink is preferably 1% by mass to 20% by mass, and more preferably 1% by mass to 10% by mass, with respect to the total amount of the colored ink.

(Surfactant)

The colored ink may include at least one surfactant.

Examples of the surfactant include the surfactants described in JP1987-173463A (JP-S62-173463A) and JP1987-183457A (JP-S62-183457A).

Examples of the surfactant include anionic surfactants such as a dialkylsulfosuccinic acid salt, an alkylnaphthalenesulfonic acid salt, and a fatty acid salt; nonionic surfactants such as a polyoxyethylene alkyl ether, a polyoxyethylene alkyl allyl ether, an acetylene glycol, a polyoxyethylene-polyoxypropylene block copolymer, and a siloxane; and cationic surfactants such as an alkylamine salt and a quaternary ammonium salt.

The content of the surfactant that can be included in the colored ink is selected as appropriate; however, the content is preferably 0.0001% by mass to 1% by mass, and more preferably 0.01% by mass to 1% by mass, with respect to the total amount of the colored ink.

(Polymerization Inhibitor)

The colored ink may include at least one polymerization inhibitor.

Examples of the polymerization inhibitor include p-methoxyphenol, a quinone (for example, hydroquinone, benzoquinone, or methoxybenzoquinone), phenothiazine, a catechol, an alkylphenol (for example, dibutylhydroxytoluene (BHT)), an alkylbisphenol, zinc dimethyldithiocarbamate, copper dimethyldithiocarbamate, copper dibutyldithiocarbamate, copper salicylate, a thiodipropionic acid ester, mercaptobenzimidazole, a phosphite, 2,2,6,6-tetramethylpiperidine-1-oxyl (TEMPO), 2,2,6,6-tetramethyl-4-hydroxypiperidine-1-oxyl (TEMPOL), Cupferron A1, and a tris(N-nitroso-N-phenylhydroxylamine)aluminum salt.

Among these, at least one selected from p-methoxyphenol, a catechol, a quinone, an alkylphenol, TEMPO, TEMPOL, Cupferron A1, and a tris(N-nitroso-N-phenylhydroxylamine)aluminum salt is preferred; and at least one selected from p-methoxyphenol, hydroquinone, benzoquinone, BHT, TEMPO, TEMPOL, Cupferron A1, and a tris(N-nitroso-N-phenylhydroxylamine)aluminum salt is more preferred.

The content of the polymerization inhibitor in the colored ink is selected as appropriate; however, the content is preferably 0.0001% by mass to 1% by mass, and more preferably 0.01% by mass to 1% by mass, with respect to the total amount of the colored ink.

(Other Components)

The colored ink may also include, if necessary, components other than those described above.

Examples of the other components include a sensitizer, an ultraviolet absorber, an antioxidant, a discoloration preventer, a conductive salt, and a basic compound.

(Preferred Properties of Colored Ink)

The surface tension of the colored ink at 25° C. is preferably from 18 mN/m to 40 mN/m, more preferably from 22 mN/m to 35 mN/m, and even more preferably from 25 mN/m to 30 mN/m.

The surface tension can be measured in an environment at a temperature of 25° C. using an Automatic Surface Tensiometer CBVP-Z (Kyowa Interface Science Co., Ltd.).

The viscosity of the colored ink at 25° C. is preferably 200 mPa·s or less, more preferably 100 mPa·s or less, even more preferably 25 mPa·s or less, still more preferably 15 mPa·s or less, and particularly preferably 12 mPa·s or less.

Furthermore, the viscosity of the colored ink at 25° C. is preferably 2 mPa·s or more, more preferably 4 mPa·s or more, and particularly preferably 5 mPa·s or more.

The viscosity of the colored ink is a value measured using VISCOMETER TV-22 (manufactured by Toki Sangyo Co., Ltd.).

<Clear Ink>

The clear ink includes an organic solvent A2 and a bifunctional or higher-functional (meth)acrylate compound X2 having an average molecular weight of 1,000 to 30,000, and the content of the organic solvent A2 with respect to the total amount of the clear ink is 30% by mass or more, while the content of the (meth)acrylate compound X2 with respect to the total amount of the clear ink is 5% by mass or more.

(Organic Solvent A2)

The clear ink includes at least one organic solvent A2.

A preferred range of the content of the organic solvent A2 with respect to the total amount of the clear ink is as described above.

Specific examples of the organic solvent A2 are similar to the specific examples of the organic solvent A1.

However, it is not necessary that the type of the organic solvent A1 included in the colored ink and the type of the organic solvent A2 included in the clear ink are completely identical, and there may be at least some differences.

The preferred solvent type and preferred boiling point of the organic solvent A2 are also similar to the preferred solvent type and preferred boiling point of the organic solvent A1.

However, it is not necessary that the type of the organic solvent A1 included in the colored ink and the type of the organic solvent A2 included in the clear ink are completely the same, and there may be at least some differences.

The preferred solvent type of the organic solvent A2 is similar to the preferred solvent type of the organic solvent A1.

From the viewpoint of optimization of the viscosity of the clear ink (and jetting stability in the case of a clear inkjet ink), the proportion occupied by at least one compound selected from the group consisting of a glycol ether, an organic carbonate, and an ester in the organic solvent A2 is preferably 80% by mass to 100% by mass (more preferably 90% by mass to 100% by mass, even more preferably 95% by mass to 100% by mass, and most preferably 100% by mass).

From the viewpoints of optimization of the viscosity of the clear ink (and jetting stability in the case of a clear inkjet ink) and the scratch resistance of the image, the proportion occupied by a compound having a boiling point of 140° C. to 250° C. (more preferably a boiling point of 150° C. to 250° C., and even more preferably a boiling point of 150° C. to 200° C.) in the organic solvent A2 is preferably 80% by mass to 100% by mass (more preferably 90% by mass to 100% by mass, even more preferably 95% by mass to 100% by mass, and most preferably 100% by mass).

((Meth)acrylate Compound X2)

The clear ink in the ink set of the present disclosure includes at least one bifunctional or higher-functional (meth)acrylate compound X2 having a weight average molecular weight of 1,000 to 30,000.

The (meth)acrylate compound X2 is preferably a bifunctional to hexafunctional (meth)acrylate compound, from the viewpoint of further enhancing the abrasion resistance and alcohol resistance of the image.

The (meth)acrylate compound X2 is preferably urethane (meth)acrylate, bisphenol A epoxy (meth)acrylate, or epoxy novolac (meth)acrylate; and particularly preferably urethane (meth)acrylate.

Regarding the (meth)acrylate compound X2, a commercially available product may be used, and examples of the commercially available product include oligomers such as CN996 (bifunctional oligomer, urethane acrylate, weight average molecular weight (Mw)=2,850) of Sartomer Company, Inc.; UA-122P (bifunctional oligomer, urethane acrylate, Mw=1,100) of Shin Nakamura Chemical Co., Ltd.; SHIKOH (registered trademark) UV-6630B (bifunctional oligomer, urethane acrylate, Mw=3,000), SHIKOH (registered trademark) UV-3310B (bifunctional oligomer, urethane acrylate, Mw=5,000), and SHIKOH (registered trademark) UV-7630B (hexafunctional oligomer, urethane acrylate, Mw=2,200) of Nippon Synthetic Chemical Industry Co., Ltd.

The weight average molecular weight (Mw) of the (meth)acrylate compound X2 is preferably 1,500 to 15,000, more preferably 2,000 to 10,000, and particularly preferably 2,000 to 7,000, from the viewpoint of optimization of the viscosity of the clear ink (and jetting stability in the case of a clear inkjet ink).

The content of the (meth)acrylate compound X2 with respect to the total amount of the clear ink is 5% by mass or more. As described above, the flexibility and alcohol resistance of the image are further enhanced thereby.

The content of the (meth)acrylate compound X2 with respect to the total amount of the clear ink is preferably 5% by mass to 60% by mass, more preferably 5% by mass to 40% by mass, and particularly preferably 10% by mass to 30% by mass.

In a case in which the content of the (meth)acrylate compound X2 in the clear ink is 60% by mass or less, there is a tendency that the clear ink can be applied more easily.

(Other Polymerizable Compound)

The clear ink in the ink set of the present disclosure may include a polymerizable compound other than the (meth)acrylate compound X2, for example, a polymerizable compound having a weight average molecular weight of less than 1,000, to the extent that the effects of the present disclosure are not impaired.

However, from the viewpoint of the flexibility of the image, the content of a monofunctional polymerizable compound with respect to the total amount of the polymerizable compounds included in the clear ink (hereinafter, also simply referred to as "polymerizable compounds B2") is preferably 90% by mass or less, more preferably 70% by mass or less, even more preferably 50% by mass or less, still more preferably 40% by mass or less, even more preferably 20% by mass or less, and particularly preferably 10% by mass or less. Meanwhile, it is also preferable that the content of the monofunctional polymerizable compound with respect to the total amount of the polymerizable compounds is 0% by mass (that is, the polymerizable compounds include no monofunctional polymerizable compound).

From the viewpoint of the flexibility of the image, the content of the monofunctional polymerizable compound with respect to the total amount of the clear ink is preferably 40% by mass or less, more preferably 30% by mass or less, even more preferably 20% by mass or less, still even more preferably 10% by mass, and particularly preferably 5% by mass or less.

The content of the polymerizable compounds included in the clear ink as explained above is preferably 5% by mass to 60% by mass, more preferably 5% by mass to 50% by mass, and particularly preferably 10% by mass to 30% by mass, with respect to the total amount of the clear ink.

In a case in which the content of the polymerizable compounds with respect to the total amount of the clear ink is 5% by mass or more, the scratch resistance of the image is further enhanced.

In a case in which the content of the polymerizable compounds with respect to the total amount of the clear ink is 60% by mass or less, there is a tendency that the clear ink can be applied more easily.

(Photopolymerization Initiator)

It is preferable that the clear ink includes at least one photopolymerization initiator.

Specific examples of the photopolymerization initiator that can be included in the clear ink are similar to the specific examples of the photopolymerization initiator that can be included in the colored ink.

The content of the photopolymerization initiator that can be included in the clear ink is preferably 1% by mass to 20% by mass, and more preferably 4% by mass to 20% by mass, with respect to the total amount of the clear ink.

(Surfactant)

The clear ink may include at least one surfactant.

Specific examples of the surfactant that can be included in the clear ink are similar to the specific examples of the surfactant that can be included in the colored ink.

The content of the surfactant that can be included in the clear ink is selected as appropriate; however, the content is preferably 0.0001% by mass to 1% by mass, and more preferably 0.01% by mass to 1% by mass, with respect to the total amount of the clear ink.

(Polymerization Inhibitor)

The clear ink may include at least one polymerization inhibitor.

Specific examples of the polymerization inhibitor that can be included in the clear ink are similar to the specific examples of the polymerization inhibitor that can be included in the colored ink.

The content of the polymerization inhibitor that can be included in the clear ink is selected as appropriate; however, the content is preferably 0.0001% by mass to 1% by mass, and more preferably 0.01% by mass to 1% by mass, with respect to the total amount of the clear ink.

((Meth)acrylic-Modified Polyorganosiloxane)

From the viewpoint of further enhancing the abrasion resistance of the image, it is preferable that the clear ink further includes a (meth)acrylic-modified polyorganosiloxane.

The (meth)acrylic-modified polyorganosiloxane is preferably a (meth)acrylic-modified polyorganosiloxane that does not have a polymerizable group.

The weight average molecular weight (Mw) of the (meth)acrylic-modified polyorganosiloxane is preferably 20,000 to 400,000.

In a case in which the Mw of the (meth)acrylic-modified polyorganosiloxane is 20,000 or more, the abrasion resistance of the image is further enhanced. The Mw of the (meth)acrylic-modified polyorganosiloxane is more preferably 30,000 or more, and particularly preferably 50,000 or more, from the viewpoint of the abrasion resistance of the image.

Furthermore, in a case in which the Mw of the (meth)acrylic-modified polyorganosiloxane is 400,000 or less, the viscosity of the clear ink can be further reduced, and in a case in which the clear ink is a clear inkjet ink, jetting stability can be further increased.

The (meth)acrylic-modified polyorganosiloxane is a copolymer of at least one reactive polysiloxane having at least one of a polymerizable group and a mercapto group (hereinafter, also referred to as "particular reactive polysiloxane") and at least one (meth)acrylic acid ester, and a (meth)acrylic-modified polyorganosiloxane that does not have a polymerizable group (hereinafter, also referred to as "particular (meth)acrylic-modified polyorganosiloxane") is particularly preferred.

The particular (meth)acrylic-modified polyorganosiloxane is particularly preferably a graft copolymer of a particular reactive polysiloxane and a (meth)acrylic acid ester.

The content of the (meth)acrylic-modified polyorganosiloxane in the clear ink is preferably 0.1% by mass to 5.0% by mass with respect to the total amount of the clear ink.

In a case in which the content is 0.1% by mass or more, the abrasion resistance of the image is enhanced. The above-mentioned content is preferably 0.2% by mass or more, and more preferably 0.5% by mass or more, from the viewpoint of further enhancing the abrasion resistance of the image.

In a case in which the content is 5.0% by mass or less, the viscosity of the clear ink can be further decreased, and in the case of a clear inkjet ink, jetting stability can be further increased. From such a viewpoint, the content is preferably 4.0% by mass or less, and more preferably 3.0% by mass or less.

The copolymerization mass ratio between the particular reactive polysiloxane and the (meth)acrylic acid ester [(meth)acrylic acid ester particular reactive polysiloxane] in the particular (meth)acrylic-modified polyorganosiloxane is preferably 0.5 to 10.0, more preferably 1.0 to 5.0, even more preferably 2.0 to 4.0, and particularly preferably 2.0 to 3.0.

There may be only one kind of the particular reactive polysiloxane for forming the particular (meth)acrylic-modified polyorganosiloxane (that is, reactive polysiloxane having at least one of a polymerizable group and a mercapto group), or there may be two or more kinds thereof.

The particular reactive polysiloxane is preferably at least one compound represented by the following Formula (I).

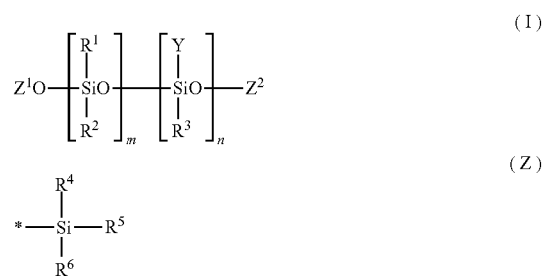

In Formula (I), $R^1$, $R^2$, and $R^3$ each independently represent a hydrocarbon group having 1 to 20 carbon atoms, a halogenated hydrocarbon group having 1 to 20 carbon atoms, or a hydrocarbonoxy group having 1 to 20 carbon atoms; Y represents an organic group having at least one of a polymerizable group and a mercapto group; $Z^1$ and $Z^2$ each independently represent a hydrogen atom, an alkyl group having 1 to 10 carbon atoms, or a group represented by Formula (Z); m represents an integer from 1 to 10,000; and n represents an integer of 1 or larger.

In Formula (Z), $R^4$ and $R^5$ each independently represent a hydrocarbon group having 1 to 20 carbon atoms, a halogenated hydrocarbon group having 1 to 20 carbon atoms, or a hydrocarbonoxy group having 1 to 20 carbon atoms; $R^6$ represents a hydrocarbon group having 1 to 20 carbon atoms, a halogenated hydrocarbon group having 1 to 20 carbon atoms, a hydrocarbonoxy group having 1 to 20 carbon atoms, or an organic group having at least one of a polymerizable group and a mercapto group; and the symbol represents the position of bonding.

In Formula (I) and Formula (Z), the number of carbon atoms in the hydrocarbon group having 1 to 20 carbon atoms for $R^1$ to $R^6$ is preferably 1 to 10, and more preferably 1 to 6. The hydrocarbon group may be a linear hydrocarbon group, may be a branched hydrocarbon group, or may be a cyclic hydrocarbon group. The hydrocarbon group is preferably an aliphatic hydrocarbon group, and more preferably an alkyl group.

In Formula (I) and Formula (Z), preferred embodiments of the halogenated hydrocarbon group having 1 to 20 carbon atoms for $R^1$ to $R^6$ are similar to the preferred embodiments of the hydrocarbon group having 1 to 20 carbon atoms for $R^1$ to $R^6$, except that the hydrocarbon group is substituted with at least one halogen atom.

The halogen atom is preferably a fluorine atom, a chlorine atom, a bromine atom, or an iodine atom; more preferably a fluorine atom, a chlorine atom, or a bromine atom; and particularly preferably a fluorine atom or a chlorine atom.

In Formula (I) and Formula (Z), the number of carbon atoms of the hydrocarbonoxy group having 1 to 20 carbon atoms for $R^1$ to $R^6$ is preferably 1 to 10, and more preferably 1 to 6. Furthermore, the hydrocarbonoxy group may be a linear hydrocarbonoxy group, may be a branched hydrocarbonoxy group, or may be a cyclic hydrocarbonoxy group. The hydrocarbonoxy group is preferably an aliphatic hydrocarbonoxy group, and more preferably an alkoxy group.

In Formula (I) and Formula (Z), the polymerizable group for Y and $R^6$ is preferably a group containing an ethylenic double bond, and more preferably a group containing at least one of a vinyl group and a 1-methylvinyl group.

The polymerizable group is particularly preferably a (meth)acryloyl group, from the viewpoints of the polymerization reactivity and the hardness of the film thus formed.

In Formula (I) and Formula (Z), the number of carbon atoms of the organic group having at least one of a polymerizable group and a mercapto group for Y and $R^6$ is preferably 1 to 20, more preferably 1 to 10, and particularly preferably 1 to 6.

The organic group having at least one of a polymerizable group and a mercapto group for Y and $R^6$ is particularly preferably a mercapto alkyl group having 1 to 20 carbon atoms.

In Formula (I), m represents an integer from 1 to 10,000; however, m is preferably an integer from 2 to 1,000, more preferably an integer from 3 to 500, and particularly preferably an integer from 5 to 100.

In Formula (I), n represents an integer of 1 or larger; however, n is preferably an integer from 2 to 1,000, more preferably an integer from 3 to 500, and particularly preferably an integer from 5 to 100.

However, each of m and n in Formula (I) can be appropriately adjusted such that the Mw of the particular (meth)acrylic-modified polyorganosiloxane acquires a value from 20,000 to 400,000.

In Formula (I), the ratio of m to n [m/n] is preferably 1 to 10,000, more preferably 1 to 1,000, and particularly preferably 1 to 100.

Even in a case in which a mixture including two or more kinds of compounds represented by Formula (I) is used for the formation of the particular (meth)acrylic-modified polyorganosiloxane, the ratio of m to n [m/n] in the entire mixture is preferably 1 to 10,000, more preferably 1 to 1,000, and particularly preferably 1 to 100.

Regarding the compound represented by Formula (I), a compound in which Y in Formula (I) represents a mercapto alkyl group having 1 to 20 (more preferably 1 to 10, and even more preferably 1 to 3) carbon atoms; $R^6$ in Formula (Z) represents a hydrocarbon group having 1 to 20 (more preferably 1 to 10, and even more preferably 1 to 3) carbon atoms, a halogenated hydrocarbon group having 1 to 20 (more preferably 1 to 10, and even more preferably 1 to 3) carbon atoms, a hydrocarbonoxy group having 1 to 20 (more preferably 1 to 10, and even more preferably 1 to 3) carbon atoms, or a mercapto alkyl group having 1 to 20 (more preferably 1 to 10, and even more preferably 1 to 3) carbon atoms, is particularly preferred.

There may be only one kind of the (meth)acrylic acid ester for forming the particular (meth)acrylic-modified polyorganosiloxane, or there may be two or more kinds thereof.

The (meth)acrylic acid ester is preferably at least one compound represented by the following Formula (II).

(II)

In Formula (II), $R^7$ represents a hydrogen atom or a methyl group; and $R^8$ represents an alkyl group having 1 to 20 carbon atoms, an alkoxyalkyl group having 2 to 20 carbon atoms, a hydroxyalkyl group having 1 to 20 carbon atoms, a cycloalkyl group having 3 to 20 carbon atoms, or an aryl group having 6 to 20 carbon atoms.

The alkyl group having 1 to 20 carbon atoms for $R^8$ in Formula (II) may be a linear alkyl group or a branched alkyl group.

Furthermore, the alkyl group having 1 to 20 carbon atoms may be any alkyl group as long as the number of carbon atoms is 1 to 20, and the alkyl group may be an unsubstituted linear alkyl group or an unsubstituted branched alkyl group; may be a linear alkyl group or a branched alkyl group, which has been substituted with a cycloalkyl group; or may be a linear alkyl group or a branched alkyl group, which has been substituted with an aryl group (that is, an aralkyl group).

The number of carbon atoms of the alkyl group having 1 to 20 carbon atoms is preferably 1 to 12, more preferably 1 to 10, and particularly preferably 1 to 6.

The alkoxyalkyl group having 2 to 20 carbon atoms for $R^8$ in Formula (II) has the same meaning as the alkyl group having 1 to 20 carbon atoms for $R^8$ in Formula (II), except that the total number of carbon atoms of the alkoxyalkyl group as a whole is 2 to 20 and that the alkyl group has been substituted with an alkoxy group. Preferred embodiments thereof are also similar.

The number of carbon atoms of the alkoxyalkyl group having 2 to 20 carbon atoms (total number of carbon atoms of the alkoxyalkyl group as a whole) is preferably 2 to 12, more preferably 2 to 10, and particularly preferably 2 to 6.

The hydroxyalkyl group having 1 to 20 carbon atoms for $R^8$ in Formula (II) has the same meaning as the alkyl group having 1 to 20 carbon atoms for $R^8$ in Formula (II), except that the alkyl group has been substituted by a hydroxy group. Preferred embodiments thereof are also similar.

The cycloalkyl group having 3 to 20 carbon atoms for $R^8$ in Formula (II) may be an unsubstituted cycloalkyl group, or may be a cycloalkyl group that has been substituted with a linear alkyl group or a branched alkyl group.

The number of carbon atoms of the cycloalkyl group having 3 to 20 carbon atoms is preferably 3 to 12, more preferably 3 to 10, and particularly preferably 3 to 6.

The aryl group having 6 to 20 carbon atoms for $R^8$ in Formula (II) may be an unsubstituted aryl group, or may be an aryl group that has been substituted with an alkyl group.

The number of carbon atoms of the aryl group having 6 to 20 carbon atoms is preferably 6 to 12.

Regarding the (meth)acrylic-modified polyorganosiloxane (for example, particular (meth)acrylic-modified polyorganosiloxane), a commercially available product can be used.

Examples of the commercially available product include CHALINE R175S and R170 of Nissin Chemical Industry Co., Ltd.

(Other Components)

The clear ink may also include, if necessary, components other than those described above.

Examples of the other components include a sensitizer, an ultraviolet absorber, an antioxidant, a discoloration preventer, a conductive salt, and a basic compound.

(Preferred Properties of Clear Ink)

The surface tension of the clear ink at 25° C. is preferably from 18 mN/m to 40 mN/m, more preferably 22 mN/m to 35 mN/m, and even more preferably from 23 mN/m to 30 mN/m.

The surface tension can be measured in an environment at a temperature of 25° C. using an Automatic Surface Tensiometer CBVP-Z (Kyowa Interface Science Co., Ltd.).

The viscosity of the clear ink at 25° C. is preferably 200 mPa·s or less, more preferably 100 mPa·s or less, even more preferably 25 mPa·s or less, still more preferably 10 mPa·s or less, and particularly preferably 7 mPa·s or less.

Furthermore, the viscosity of the clear ink at 25° C. is preferably 2 mPa·s or higher, more preferably 4 mPa·s or higher, and particularly preferably 5 mPa·s or higher.

The viscosity of the clear ink is a value measured using VISCOMETER TV-22 (manufactured by Toki Sangyo Co., Ltd.).

[Image Forming Method]

Hereinafter, an embodiment of the image forming method using the ink set of the present disclosure will be explained; however, the present disclosure is not limited to the following embodiment.

The image forming method of the present embodiment comprises a colored image forming step of applying a colored ink on a substrate using the ink set of the present disclosure described above and thereby forming a colored image; and a clear image forming step of applying a clear ink at least on the colored image, irradiating the applied clear ink with active energy ray, and thereby forming a clear image (that is, an overcoat film) at least on the colored image.

The image forming method of the present embodiment may comprise other steps according to necessity.

According to the image forming method of the present embodiment, an image having excellent abrasion resistance, alcohol resistance, and flexibility (overcoat film-attached colored image) can be formed.

<Colored Image Forming Step>

The colored image forming step is a step of forming a colored image by applying a colored ink on a substrate.

Regarding the method of applying a colored ink on a substrate, coating, printing, jetting from an inkjet head, and the like are applicable. Among them, from the viewpoint that a fine image can be formed, jetting from an inkjet head is preferred.

There are no particular limitations on the method of jetting from an inkjet head, and any known system, for example, charge control system of jetting an ink by utilizing electrostatic attraction force; a drop-on-demand system of utilizing a vibration pressure of a piezoelectric element (pressure pulse system); an acoustic inkjet system of converting electric signals into acoustic beams, irradiating an ink with the acoustic beams, and jetting the ink by utilizing a radiation pressure; and a thermal inkjet system of heating an ink to form bubbles, and utilizing the pressure resulting therefrom (BUBBLEJET (registered trademark)) can be utilized as appropriate.

The colored image forming step in the case of jetting a colored ink from an inkjet head can be carried out by using a known inkjet recording apparatus.

Examples of the recording system of the inkjet recording apparatus include a shuttle system in which a short serial head is used, and recording is performed while the head is caused to move in a scanning manner along the width direction of a medium to be recorded; and a line system utilizing a line head in which recording elements are arranged to face the entire length of one side of a medium to be recorded (single pass system).

In the present embodiment, an inkjet recording apparatus of any one of the shuttle system and the line system may be used. Regarding the inkjet recording apparatus of the shuttle system, for example, JP2010-280828A can be referred to.

In the colored image forming step, it is preferable that after application of the colored ink on a substrate, a step of drying the colored ink on the substrate is included.

Here, drying of the colored ink means that at least a portion of the organic solvent A1 in the colored ink is removed.

Drying may be natural drying; however, from the viewpoint of more rapidly performing image formation and from the viewpoint of further enhancing the alcohol resistance of the colored image produced by the colored ink, heated drying is preferred.

From the viewpoint of suppressing bleeding of the image, increasing the adhesiveness of the image, and enhancing the alcohol resistance of the image, it is preferable that heated drying is carried out by maintaining the surface temperature of the substrate at 40° C. to 100° C. (more preferably 40° C. to 80° C., and even more preferably 50° C. to 70° C.).

From a viewpoint such as described above, the time of heated drying is preferably 1 second or longer, more preferably 5 seconds or longer, and particularly preferably 8 seconds or longer.

There are no particular limitations on the upper limit of the time of heated drying; however, the upper limit is preferably 60 seconds, more preferably 30 seconds, and particularly preferably 20 seconds.

In a case in which the colored ink includes a polymerizable compound (for example, the (meth)acrylate compound X1 described above), in the colored image forming step, it is preferable that a step of irradiating the colored ink applied on the substrate with active energy ray (after drying the colored ink as necessary) is included. Thereby, a colored image cured by polymerization of the polymerizable compound is obtained. The colored image thus obtained has excellent strength. As a result, the alcohol resistance of the overcoat film-attached colored image finally obtained is further enhanced.

Regarding the active energy ray, α-ray, γ-ray, electron beam, X-ray, ultraviolet ray, visible light, infrared light, or the like can be used. In a case in which a sensitizer is used, the peak wavelength of the active energy ray may depend on the absorption characteristics of the sensitizer; however, for example, the peak wavelength is preferably 200 nm to 600 nm, more preferably 300 nm to 450 nm, and even more preferably 350 nm to 420 nm.

Regarding the illuminance of the exposed surface, it is preferable that curing is performed at 10 mJ/cm$^2$ to 10,000 mJ/cm$^2$, more preferably 100 mJ/cm$^2$ to 5,000 mJ/cm$^2$.

Regarding the active energy ray source, general active energy ray sources such as a mercury lamp, a metal halide lamp, a gas laser, a solid-state laser, and a GaN-based semiconductor ultraviolet light emitting device (a light emitting diode (LED), a laser diode (LD), or the like) can be used without any particular limitations.

As an example of LED, Nichia Corporation has launched a violet LED, the main emission spectrum of which has a wavelength between 365 nm and 420 nm. In a case in which even a shorter wavelength is needed, an LED capable of emitting active energy ray having the center of the wavelength between 300 nm and 370 nm, which is disclosed in U.S. Pat. No. 6,084,250A may be mentioned as an example as the LED. Other ultraviolet LEDs are also available and can emit radiation in different ultraviolet bandwidths.

The irradiation time for the active energy ray is preferably 0.01 seconds to 120 seconds, and more preferably 0.1 seconds to 90 seconds.

Regarding specific systems for the irradiation with active energy ray, a shuttle system in which a short serial head is provided with an active energy ray irradiation apparatus, and irradiation is performed while the head is caused to move in a scanning manner along the width direction of a medium to be recorded; a single pass system in which active energy ray irradiation apparatuses are arranged to face the entire length of one side of a medium to be recorded; and the like may be mentioned.

Regarding the irradiation conditions for active energy ray and basic irradiation methods, for example, known documents such as JP1985-132767A (JP-S60-132767A) may be referred to.

In a case in which heated drying is performed, it is preferable that the irradiation with active energy ray is carried out in a certain time (preferably 0.01 seconds to 0.5 seconds, more preferably 0.01 seconds to 0.3 seconds, and even more preferably 0.01 seconds to 0.15 seconds) after completion of the heated drying.

Furthermore, curing of the colored ink may be completed by means of a separate light source that is not associated with driving. WO9954415A discloses a method of using optical fibers as a method for irradiation, or a method of irradiating a recorded part with ultraviolet light by aiming light from a collimated light source at a mirror surface provided on the head unit side surface. These curing methods can also be applied to as the image forming method of the present embodiment.

<Clear Image Forming Step>

The clear image forming step is a step of applying a clear ink at least on a colored image, irradiating the applied clear ink with active energy ray, and thereby forming a clear image (that is, an overcoat film) at least on the colored image.

In the clear image forming step, the clear ink may be applied only on the colored image on the substrate, or the clear ink may be applied on regions including a colored image formation region and a non-colored image formation region (for example, the entire surface of the substrate) on the substrate.

Preferred embodiments of the method for applying the clear ink on the colored image are similar to the preferred embodiments of the method for applying the colored ink on the substrate as described above.

In the clear image forming step, a clear image is formed by irradiating the clear ink that has been applied at least on the colored image, with active energy ray (if necessary, after the clear ink is dried). As a result of irradiation of the clear ink with active energy ray, a clear image, which is a cured image formed by curing of the clear ink, is formed. As the colored image is coated with this clear image, an overcoat film-attached colored image having excellent scratch resistance, alcohol resistance, and flexibility is formed.

Preferred embodiments of the irradiation of the clear ink with active energy ray are similar to the preferred embodiments of the possible irradiation of the colored ink with active energy ray as described above.

In the clear image forming step, it is preferable to include a step of drying the clear ink at least on the colored image, between the application of the clear ink at least on the colored image and irradiation of the clear ink with active energy ray.

Here, drying of the clear ink means that at least a portion of the organic solvent A2 in the clear ink is removed.

Drying may be natural drying; however, from the viewpoint of more rapidly performing image formation, heated drying is preferred.

Preferred embodiments of the heated drying that may be performed for the clear ink are similar to the preferred embodiments of the heated drying that may be performed for the colored ink.

EXAMPLES

The present disclosure will be described below more specifically by way of Examples. The scope of the present disclosure is not intended to be limited to the specific examples disclosed below. Unless particularly stated otherwise, the units "parts" and "percent (%)" are on a mass basis.

[Production of Pigment Dispersion]

Components other than pigments as shown in the following Table 1 were mixed to achieve the compositions of Table 1, and the mixture was stirred using a mixer of Silverson Machines, Ltd. under the conditions of 2,000 rotations/min to 3,000 rotations/min for 10 minutes to 15 minutes. Thus, uniform dispersant-diluted liquids were obtained. To each of these dispersant-diluted liquids, the respective types of pigments were added in the respective amounts described in Table 1, and the resulting mixture was further stirred with a mixer under the conditions of 2,000 rotations/min to 3,000 rotations/min for 10 minutes to 20 minutes. Thus, 500 parts of a uniform preliminary dispersion liquid was obtained.

Subsequently, each preliminary dispersion liquid thus obtained was subjected to dispersion processing using a circulation type beads mill apparatus (SL-012C1) manufactured by Dispermat Co., Ltd. Thus, pigment dispersions of various colors were obtained. This dispersion processing was carried out by charging 200 parts of zirconia beads having a diameter of 0.65 mm into the circulation type beads mill apparatus, under the conditions of a circumferential speed of 15 ms and a dispersing time of 1 hour to 6 hours.

TABLE 1

|  |  | Pigment millbase Cyan 1 | Pigment millbase Magenta 1 | Pigment millbase Yellow 1 | Pigment millbase Black 1 |
| --- | --- | --- | --- | --- | --- |
| Pigment |  | PB15:4 | Mixed-crystal quinacridone | PY155 | Carbon black |
|  |  | 30% by mass | 30% by mass | 30% by mass | 30% by mass |
| Dispersant |  | Sol32000 | Sol32000 | Sol32000 | Sol32000 |
|  |  | 10% by mass | 15% by mass | 10% by mass | 10% by mass |
| DEGDE |  | 60% by mass | 55% by mass | 60% by mass | 60% by mass |

The details of the components in Table 1 are as follows.
PB15:4 . . . C.I. Pigment Blue 15:4, BASF SE, HELIOGEN BLUED 7110F
Mixed-crystal quinacridone . . . BASF E, CINQUASIA MAGENTA L 4540
PY155 . . . C.I. Pigment Yellow 155, Clariant AG, INK JET YELLOW 4GC
Carbon black . . . Cabot Corporation, MOGUL E
Sol 32000 . . . Luburizol Corporation, SOLSPERSE 32000
DEGDE . . . Tokyo Chemical Industry Co., Ltd., diethylene glycol diethyl ether Example 1

<Preparation of Ink Set>
An ink set comprising a colored ink as described below and a clear ink as described below was prepared.
The colored ink and the clear ink were respectively produced by mixing the various components of the compositions described in the following Table 2, and stirring the mixture with a mixer manufactured by Silverson Machines, Ltd. under the conditions of 2,000 rotations/min to 3,000 rotations/min for 10 minutes to 15 minutes.
Here, the colored ink is a cyan ink in the present Example 1.
<Formation of Colored Image>
An inkjet printer equipped with Inkjet Head CA4 manufactured by Toshiba TEC Corporation was prepared.
This inkjet printer was charged with the colored ink of the above-described ink set, and an uncured colored solid image (cyan solid image in Example 1) was formed on a substrate [PVC leather; CUPPUCCINO CP-830 (Yamaplas Co., Ltd.)] by jetting out the colored ink thereon from the inkjet head that had been warmed to 35° C. At this time, the image density was set to 1,200 dpi×600 dpi, and the amount of application of the colored ink onto the substrate was set to 15 g/m². Hereinafter, an uncured colored solid image may also be referred to as colored solid uncured image.
Next, the substrate having the colored solid uncured image formed thereon was heated using a rubber heater at a substrate temperature of 60° C. for 15 seconds, and thereby the colored solid uncured image was dried.
Next, the colored solid uncured image was cured by irradiating the dried colored solid uncured image with UV (ultraviolet ray) at an irradiation amount of 3,000 mJ/cm² using a UV exposure machine, and thus a colored image was obtained.
In the present specification, the term "dpi" means dots per inch.
<Formation of Clear Image (Overcoat Film)>
Next, the above-described inkjet printer was charged with the clear ink (that is, overcoat liquid) of the ink set described above. An uncured clear solid image that covered the entirety of the colored image was formed on the substrate (PVC leather) having the colored image (that is, the cured colored solid image described above) formed thereon, by jetting out the clear ink from the inkjet head that had been warmed to 35° C. At this time, the image density was set to 1,200 dpi×600 dpi, and the amount of application of the clear ink was set to 25 g/m². Hereinafter, an uncured clear solid image may also be referred to as clear solid uncured image.
Next, the substrate having the clear solid uncured image formed thereon was heated using a rubber heater at a substrate temperature of 60° C. for 20 seconds, and thereby the clear solid uncured image was dried.

Next, the clear solid uncured image was cured by irradiating the dried clear solid uncured image with UV (ultraviolet ray) at an irradiation amount of 3,000 mJ/cm² using a UV exposure machine, and thus a clear image was obtained.
Thus, an overcoat film-attached colored image composed of a colored image and an overcoat film covering the entirety of this colored image was obtained.
<Evaluations>
The following evaluations were performed for the colored ink, the clear ink, and the overcoat film-attached colored image. The results are presented in Table 2.
(IJ Jetting Stability of Colored Ink)
Under conditions similar to the conditions for forming the colored solid uncured image except that the substrate (PVC leather) was changed to an A3-sized recording paper (printing paper for inkjet; "KASSAI" manufactured by Fujifilm Corporation), a colored solid uncured image was formed by jetting out the colored ink onto the recording paper from the inkjet head as described above. In the following description, the recording paper on which the colored solid uncured image is printed will be referred to as "sample". Forty sheets of this sample were produced. Forty sheets of the sample were observed by visual inspection, and the number of sheets of the sample where nozzle slip-out (that is, image defect caused by defective jetting of nozzles) was recognized in the colored solid uncured image was examined. Based on these results, the IJ jetting stability of the colored ink was evaluated according to the following evaluation standard. In regard to the following evaluation standard, point 3 or higher is acceptable.
—Evaluation Standard for IJ Jetting Stability of Colored Ink—
Point 5: The number of sheets of the sample where nozzle slip-out was recognized is zero.
Point 4: The number of sheets of the sample where nozzle slip-out was recognized is one.
Point 3: The number of sheets of the sample where nozzle slip-out was recognized is two.
Point 2: The number of sheets of the sample where nozzle slip-out was recognized is three.
Point 1: The number of sheets of the sample where nozzle slip-out was recognized is four or greater.
(IJ Jetting Stability of Clear Ink)
Under conditions similar to the conditions for forming the clear solid uncured image except that the substrate (PVC leather) having the colored image formed thereon was changed to an A3-sized recording paper (printing paper for inkjet; "KASSAI" manufactured by Fujifilm Corporation), a clear solid uncured image was formed by jetting out the clear ink onto the recording paper from the inkjet head as described above. In the following description, the recording paper on which the clear solid uncured image is printed will be referred to as "sample". Forty sheets of this sample were produced. Forty sheets of the sample were observed by visual inspection, and the number of sheets of the sample where nozzle slip-out (that is, image defect caused by defective jetting of nozzles) was recognized in the clear solid uncured image was examined. Based on these results, the IJ jetting stability of the clear ink was evaluated according to the following evaluation standard. In regard to the following evaluation standard, point 3 or higher is acceptable.
—Evaluation Standard for IJ Jetting Stability of Clear Ink—
Point 5: The number of sheets of the sample where nozzle slip-out was recognized is zero.

Point 4: The number of sheets of the sample where nozzle slip-out was recognized is one.

Point 3: The number of sheets of the sample where nozzle slip-out was recognized is two.

Point 2: The number of sheets of the sample where nozzle slip-out was recognized is three.

Point 1: The number of sheets of the sample where nozzle slip-out was recognized is four or greater.

(Abrasion Resistance)

The overcoat film-attached colored image was subjected to abrasion for a certain number of times while applying a weight of 400 g to a dried cotton, using a Japan Society for the Promotion of Science testing machine (Suga Test Instruments Co., Ltd.). During the test, the number of times taken until scratches became visually recognizable on the overcoat film-attached colored image was recorded, and the abrasion resistance of the overcoat film-attached colored image was evaluated according to the following evaluation standard. In regard to the following evaluation standard, point 3 or higher is acceptable.

—Evaluation Standard for Abrasion Resistance—

Point 5: Scratches are not generated even after 2,000 times.

Point 4: Scratches were generated after 1,000 times or more and fewer than 2,000 times.

Point 3: Scratches were generated after 500 times or more and fewer than 1,000 times.

Point 2: Scratches were generated after 100 times or more and fewer than 500 times.

Point 1: Scratches were generated after fewer than 100 times.

(Alcohol Resistance)

The overcoat film-attached colored image was subjected to abrasion for a certain number of times while applying a weight of 400 g to a surface impregnated with ethanol, using a Japan Society for the Promotion of Science testing machine (Suga Test Instruments Co., Ltd.). During the test, the number of times taken until the overcoat film-attached colored image was peeled off and the substrate surface became visually recognizable was recorded, and the chemical resistance of the overcoat film-attached colored image was evaluated according to the following evaluation standard. In regard to the following evaluation standard, point 3 or higher is acceptable.

—Evaluation Standard for Chemical Resistance—

Point 5: The substrate surface does not become visually recognizable even after 200 times.

Point 4: The substrate surface becomes visually recognizable after 100 times or more and fewer than 200 times.

Point 3: The substrate surface becomes visually recognizable after 50 times or more and fewer than 100 times.

Point 2: The substrate surface becomes visually recognizable after 10 times or more and fewer than 50 times.

Point 1: The substrate surface becomes visually recognizable after fewer than 10 times.

(Flexibility)

The substrate having the overcoat film-attached colored image formed thereon was subjected to bending for a certain number of times, using a bending testing machine (Flexometer Yasda Precision Tools K.K.). During this test, the number of times taken until cracking became visually recognizable on the overcoat film-attached colored image was recorded, and flexibility of the overcoat film-attached colored image was evaluated according to the following evaluation standard. In regard to the following evaluation standard, point 3 or higher is acceptable.

—Evaluation Standard for Flexibility—

Point 5: Cracking does not occur even after 20,000 times.

Point 4: Cracking occurred after 10,000 times or more and fewer than 20,000 times.

Point 3: Cracking occurred after 5,000 times or more and fewer than 10,000 times.

Point 2: Cracking occurred after 1,000 times or more and fewer than 5,000 times.

Point 1: Cracking occurred after fewer than 1,000 times.

Examples 2 to 34 and Comparative Examples 1 to 6

An operation similar to Example 1 was carried out, except that at least one of the composition of the colored ink and the composition of the clear ink was changed to the composition shown in the following Table 2 to Table 5. The results are presented in Table 2 to Table 5.

TABLE 2

| | | | | Example 1 | Comparative Example 1 | Comparative Example 2 | Comparative Example 3 | Comparative Example 4 | Comparative Example 5 |
|---|---|---|---|---|---|---|---|---|---|
| Ink set | Colored ink | | Pigment millbase Cyan 1 | 5 | 5 | 5 | 5 | 5 | 5 |
| | | | Pigment millbase Magenta 1 | | | | | | |
| | | | Pigment millbase Yellow 1 | | | | | | |
| | | | Pigment millbase Black 1 | | | | | | |
| | Polymerizable compound B1 | (Meth)acrylate compound X1 | UA-122P (Mw 1100, bifunctional) | | | | | | |
| | | | CN996 (Mw 2850, bifunctional) | | | | | | |
| | | | UV-6630B (Mw 3000, bifunctional) | | | | | | |
| | | | G4316 (Mw 4000, trifunctional) | | | | | | |
| | | | UV-3310B (Mw 5000, bifunctional) | | | | | | |
| | | | G4215 (Mw 5000, bifunctional) | | | | | | |
| | | | UV-3300B (Mw 13000, bifunctional) | | | | | | |
| | | | UV-3000B (Mw 18000, bifunctional) | | | | | | |

TABLE 2-continued

| | | | | | | | | | |
|---|---|---|---|---|---|---|---|---|---|
| | | Polymerizable compound other than | DVE-3 (Mw 202, bifunctional) | | 70 | 6 | | | 6 |
| | | | PEA (Mw 192, nonfunctional) | | | | | | |
| | | Photopolymerization initiator | IRG2959 | | 3 | 1 | | | 1 |
| | | | IRG819 | | 3 | 1 | | | 1 |
| | | Surfactant | BYK33I | 0.1 | 0.1 | 0.1 | 0.1 | 0.1 | 0.1 |
| | | Polymerization inhibitor | UV12 | | 0.1 | 0.1 | | | 0.1 |
| | | Polymer C1 | VINNOL E15/45 | | | | | | |
| | | | VINNOL H14/36 | 6 | 3 | | 6 | 6 | |
| | | | VINNOL E15/40A | | | | | | |
| | | | BR-113 | | | | | | |
| | | | LTH (polyester) | | | | | | |
| | | | Polyacrylic acid | | | | | | 2 |
| | Organic solvent A1 | | EGMEA (boiling point 145° C.) | | | | | | |
| | | | MBA (boiling point 171° C.) | 88.9 | 15.8 | 86.8 | 88.9 | 88.9 | 84.8 |
| | | | DEGDEE (boiling point 189° C.) | | | | | | |
| | | | DEGBME (boiling point 212° C.) | | | | | | |
| | | Total | | 100 | 100 | 100 | 100 | 100 | 100 |
| | | [C1/(C1 + X1)] × 100 | | 100 | 100 | — | 100 | 100 | 100 |
| Clear ink | Polymerizable compound B2 | (Meth)acrylate compound X2 | CN996 (Mw 2850, bifunctional) | 10 | 10 | 10 | 10 | 2 | 10 |
| | | | G4316 (Mw 4000, trifunctional) | | | | | | |
| | | | UV-7630B (Mw 2200, hexafunctional) | 10 | 10 | 10 | 2 | 10 | 10 |
| | | Polymerizable compound other than X2 | DVE-3 (Mw 202, bifunctional) | | | | | | |
| | | | #295 (NU 296, trifunctional) | | | | | | |
| | | | PEA (Mw 192, monofunctional) | | | | 60 | 16 | |
| | | Photopolymerization initiator | IRG2959 | 5 | 5 | 5 | 5 | 5 | 5 |
| | | | IRG810 | 5 | 5 | 5 | 5 | 5 | 5 |
| | | Polymerization inhibitor | UV12 | 0.1 | 0.1 | 0.1 | 0.1 | 0.1 | 0.1 |
| | | (Methacrylic-modified polyorganosiloxane | R175S | 1 | 1 | 1 | 1 | 1 | 1 |
| | Organic solvent A2 | | DEGDEE (boiling point 189° C.) | 68.9 | 68.9 | 68.9 | 8.9 | 68.9 | 68.9 |
| | | | PC (boiling point 240° C.) | | | | | | |
| | | | IPA (boiling point 82° C.) | | | | | | |
| | | | MBA (boiling point 171° C.) | | | | | | |
| | | Total | | 100 | 100 | 100 | 100 | 100 | 100 |
| | | X2 amount | | 20 | 20 | 20 | 20 | 4 | 20 |
| | | Solubility of C1 in A1 (mass %) | | >10 | >10 | — | >10 | >10 | <3 |
| | | Solubility of C1 in A2 (mass %) | | >10 | >10 | — | >10 | >10 | <3 |
| | | X2 amount-X1 amount | | — | — | — | — | 4 | 20 |
| | | Average number of functional groups of X1 | | — | — | — | — | — | — |
| | | Average number of functional groups of X2 | | 4.00 | 4.00 | 4.00 | 4.00 | 4.00 | 4.00 |
| | | Average number of functional groups of X2-average number of functional groups of X1 | | — | — | — | — | — | — |
| Evaluation results | | Jetting stability of colored ink | | 4 | 3 | 4 | 4 | 4 | 4 |
| | | Jetting stability of clear ink | | 4 | 4 | 4 | 3 | 4 | 4 |
| | | Abrasion resistance | | 5 | 4 | 4 | 3 | 4 | 4 |
| | | Alcohol resistance | | 3 | 2 | 1 | 3 | 2 | 1 |
| | | Flexibility | | 3 | 1 | 2 | 1 | 1 | 2 |

| | | | | Comparative Example 6 | Example 2 | Example 3 | Example 4 | Example 5 |
|---|---|---|---|---|---|---|---|---|
| Ink set | Colored ink | Pigment millbase Cyan 1 | | 5 | 5 | 5 | 5 | 5 |
| | | Pigment millbase Magenta 1 | | | | | | |
| | | Pigment millbase Yellow 1 | | | | | | |
| | | Pigment millbase Black 1 | | | | | | |
| | Polymerizable compound B1 | (Meth)acrylate compound X1 | UA-122P (Mw 1100, bifunctional) | | | | | |
| | | | CN996 (Mw 2850, bifunctional) | | 0.8 | 3 | 8 | 12 |
| | | | UV-6630B (Mw 3000, bifunctional) | | | | | |
| | | | G4316 (Mw 4000, trifunctional) | | | | | |

TABLE 2-continued

| | | | | | | | |
|---|---|---|---|---|---|---|---|
| | | Polymerizable compound other than | UV-3310B (Mw 5000, bifunctional) | | | | | |
| | | | G4215 (Mw 5000, bifunctional) | | | | | |
| | | | UV-3300B (Mw 13000, bifunctional) | | | | | |
| | | | UV-3000B (Mw 18000, bifunctional) | | | | | |
| | | | DVE-3 (Mw 202, bifunctional) | | | | | |
| | | | PEA (Mw 192, nonfunctional) | | | | | |
| | Photopolymerization initiator | IRG2959 | | 0.3 | 3 | 3 | 6 |
| | | IRG819 | | 0.3 | 3 | 3 | 6 |
| | Surfactant | BYK33I | 0.1 | 0.1 | 0.1 | 0.1 | 0.1 |
| | Polymerization inhibitor | UV12 | | 0.1 | 0.1 | 0.1 | 0.1 |
| | Polymer C1 | VINNOL E15/45 | | | | | |
| | | VINNOL H14/36 | 6 | 3 | 3 | 3 | 3.5 |
| | | VINNOL E15/40A | | | | | |
| | | BR-113 | | | | | |
| | | LTH (polyester) | | | | | |
| | | Polyacrylic acid | | | | | |
| | Organic solvent A1 | EGMEA (boiling point 145° C.) | | | | | |
| | | MBA (boiling point 171° C.) | 88.9 | 90.4 | 82.8 | 77.8 | 67.3 |
| | | DEGDEE (boiling point 189° C.) | | | | | |
| | | DEGBME (boiling point 212° C.) | | | | | |
| | Total | | 100 | 100 | 100 | 100 | 100 |
| | [C1/(C1 + X1)] × 100 | | 100 | 79 | 50 | 27 | 23 |
| Clear ink | Polymerizable compound B2 | (Meth)acrylate compound X2 | CN996 (Mw 2850, bifunctional) | 10 | 10 | 10 | 10 | 10 |
| | | | G4316 (Mw 4000, trifunctional) | | | | | |
| | | | UV-7630B (Mw 2200, hexafunctional) | 10 | 10 | 10 | 10 | 10 |
| | | Polymerizable compound other than X2 | DVE-3 (Mw 202, bifunctional) | | | | | |
| | | | #295 (NU 296, trifunctional) | | | | | |
| | | | PEA (Mw 192, monofunctional) | | | | | |
| | Photopolymerization initiator | IRG2959 | 5 | 5 | 5 | 5 | 5 |
| | | IRG810 | 5 | 5 | 5 | 5 | 5 |
| | Polymerization inhibitor | UV12 | 0.1 | 0.1 | 0.1 | 0.1 | 0.1 |
| | (Methacrylic-modified polyorganosiloxane | R175S | 1 | 1 | 1 | 1 | 1 |
| | Organic solvent A2 | DEGDEE (boiling point 189° C.) | | 68.9 | 68.9 | 68.9 | 68.9 |
| | | PC (boiling point 240° C.) | | | | | |
| | | IPA (boiling point 82° C.) | 68.9 | | | | |
| | | MBA (boiling point 171° C.) | | | | | |
| | Total | | 100 | 100 | 100 | 100 | 100 |
| | X2 amount | | 20 | 20 | 20 | 20 | 20 |
| | Solubility of C1 in A1 (mass %) | | >10 | >10 | >10 | >10 | >10 |
| | Solubility of C1 in A2 (mass %) | | <10 | >10 | >10 | >10 | >10 |
| | X2 amount-X1 amount | | 20 | 19.2 | 17 | 12 | 8 |
| | Average number of functional groups of X1 | | — | 2.00 | 2.00 | 2.00 | 2.00 |
| | Average number of functional groups of X2 | | 4.00 | 4.00 | 4.00 | 4.00 | 4.00 |
| | Average number of functional groups of X2-average number of functional groups of X1 | | — | 2.00 | 2.00 | 2.00 | 2.00 |
| Evaluation results | Jetting stability of colored ink | | 4 | 5 | 5 | 5 | 4 |
| | Jetting stability of clear ink | | 2 | 4 | 4 | 4 | 4 |
| | Abrasion resistance | | 4 | 5 | 5 | 5 | 5 |
| | Alcohol resistance | | 3 | 4 | 5 | 5 | 5 |
| | Flexibility | | 1 | 3 | 5 | 5 | 5 |

TABLE 3

| | | | | Example 6 | Example 7 | Example 8 | Example 9 | Example 10 | Example 11 |
|---|---|---|---|---|---|---|---|---|---|
| Ink set | Colored ink | | Pigment millbase Cyan 1 | 5 | 5 | 5 | 5 | 5 | 5 |
| | | | Pigment millbase Magenta 1 | | | | | | |
| | | | Pigment millbase Yellow 1 | | | | | | |
| | | | Pigment millbase Black 1 | | | | | | |
| | | Polymerizable compound B1 | (Meth)acrylate compound X1 | UA-122P (Mw 1100, bifunctional) | | 3 | | | | |
| | | | | CN996 (Mw 2850, bifunctional) | 3 | | | 3 | 3 | 3 |
| | | | | UV-6630B (Mw 3000, bifunctional) | | | | | | |
| | | | | G4316 (Mw 4000, trifunctional) | | | | | | |
| | | | | UV-3310B (Mw 5000, bifunctional) | | | | | | |
| | | | | G4215 (Mw 5000, bifunctional) | | | | | | |
| | | | | UV-3300B (Mw 13000, bifunctional) | | | | | | |
| | | | | UV-3000B (Mw 18000, bifunctional) | | | 3 | | | |
| | | | Polymerizable compound other than X1 | DVE-3 (Mw 202, bifunctional) | 0.1 | | | | | |
| | | | | PEA (Mw 192, monofunctional) | 0.1 | | | | | |
| | | Photopolymerization initiator | | IRG2959 | 3 | 1 | 1 | 1 | 1 | 1 |
| | | | | IRG819 | 3 | 1 | 1 | 1 | 1 | 1 |
| | | Surfactant | | BYK331 | 0.1 | 0.1 | 0.1 | 0.1 | 0.1 | 0.1 |
| | | Polymerization inhibitor | | UV12 | 0.1 | 0.1 | 0.1 | 0.1 | 0.1 | 0.1 |
| | | Polymer C1 | | VINNOL E15/45 | | | | 3 | | |
| | | | | VINNOL H14/36 | 3 | 3 | 3 | | | |
| | | | | VINNOL E15/40A | | | | | 3 | |
| | | | | BR-113 | | | | | | 3 |
| | | | | LTH (polyester) | | | | | | |
| | | | | Polyacrylic acid | | | | | | |
| | | Organic solvent A1 | | EGMEA (boiling point 145° C.) | | | | | | |
| | | | | MBA (boiling point 171° C.) | | | | | | |
| | | | | DEGDEE (boiling point 189° C.) | 82.6 | 86.8 | 86.8 | 86.8 | 86.8 | 86.8 |
| | | | | DEGBME (boiling point 212° C.) | | | | | | |
| | | | Total | | 100 | 100 | 100 | 100 | 100 | 100 |
| | | | [C1/(C1 + X1)] × 100 | | 50 | 50 | 50 | 50 | 50 | 50 |
| | Clear ink | Polymerizable compound B2 | (Meth)acrylate compound X2 | CN996 (Mw 2850, bifunctional) | 10 | 10 | 10 | 10 | 10 | 10 |
| | | | | G4316 (Mw 4000, trifunctional) | | | | | | |
| | | | | UV-7630B (Mw 2200, hexafunctional) | 10 | 10 | 10 | 10 | 10 | 10 |
| | | | Polymerizable compound other than X2 | DVE-3 (Mw 202, bifunctional) | | | | | | |
| | | | | #295 (Mw 296, trifunctional) | | | | | | |
| | | | | PEA (Mw 192, monofunctional) | | | | | | |
| | | Photopolymerization initiator | | IRG2959 | 5 | 5 | 5 | 5 | 5 | 5 |
| | | | | IRG819 | 5 | 5 | 5 | 5 | 5 | 5 |
| | | Polymerization inhibitor | | UV12 | 0.1 | 0.1 | 0.1 | 0.1 | 0.1 | 0.1 |
| | | (Meth)acrylic-modified polyorganosiloxane | | R175S | 1 | 1 | 1 | 1 | 1 | 1 |

TABLE 3-continued

|  |  |  |  |  |  |  |  |  |
|---|---|---|---|---|---|---|---|---|
|  | Organic solvent A2 | DEGDEE (boiling point 189° C.) | 68.9 | 68.9 | 68.9 | 68.9 | 68.9 | 68.9 |
|  |  | PC (boiling point 240° C.) |  |  |  |  |  |  |
|  |  | IPA (boiling point 82° C.) |  |  |  |  |  |  |
|  |  | MBA (boiling point 171° C.) |  |  |  |  |  |  |
|  |  | Total | 100 | 100 | 100 | 100 | 100 | 100 |
|  |  | X2 amount | 20 | 20 | 20 | 20 | 20 | 20 |
|  | Solubility of C1 in A1 (mass %) |  | ≥10 | ≥10 | ≥10 | ≥10 | ≥10 | ≥10 |
|  | Solubility of C1 in A2 (mass %) |  | ≥10 | ≥10 | ≥10 | ≥10 | ≥10 | ≥10 |
|  | X2 amount-X1 amount |  | 17 | 17 | 17 | 17 | 17 | 17 |
|  | Average number of functional groups of X1 |  | 2.00 | 2.00 | 2.00 | 2.00 | 2.00 | 2.00 |
|  | Average number of functional groups of X2 |  | 4.00 | 4.00 | 4.00 | 4.00 | 4.00 | 4.00 |
|  | Average number of functional groups of X2-average number of functional groups of X1 |  | 2.00 | 2.00 | 2.00 | 2.00 | 2.00 | 2.00 |
| Evaluation results | Jetting stability of colored ink |  | 5 | 3 | 3 | 5 | 5 | 4 |
|  | Jetting stability of clear ink |  | 4 | 4 | 4 | 4 | 4 | 4 |
|  | Abrasion resistance |  | 5 | 5 | 5 | 5 | 5 | 5 |
|  | Alcohol resistance |  | 5 | 5 | 5 | 5 | 5 | 3 |
|  | Flexibility |  | 5 | 5 | 5 | 5 | 5 | 5 |

|  |  |  |  |  | Example 12 | Example 13 | Example 14 | Example 15 | Example 16 | Example 17 |
|---|---|---|---|---|---|---|---|---|---|---|
| Ink set | Colored ink |  | Pigment millbase Cyan 1 |  | 5 | 5 | 5 | 5 | 5 | 5 |
|  |  |  | Pigment millbase Magenta 1 |  |  |  |  |  |  |  |
|  |  |  | Pigment millbase Yellow 1 |  |  |  |  |  |  |  |
|  |  |  | Pigment millbase Black 1 |  |  |  |  |  |  |  |
|  |  | Polymerizable compound B1 | (Meth) acrylate compound X1 | UA-122P (Mw 1100, bifunctional) |  |  |  |  |  |  |
|  |  |  |  | CN996 (Mw 2850, bifunctional) | 3 | 3 | 3 | 3 | 3 | 3 |
|  |  |  |  | UV-6630B (Mw 3000, bifunctional) |  |  |  |  |  |  |
|  |  |  |  | G4316 (Mw 4000, trifunctional) |  |  |  |  |  |  |
|  |  |  |  | UV-3310B (Mw 5000, bifunctional) |  |  |  |  |  |  |
|  |  |  |  | G4215 (Mw 5000, bifunctional) |  |  |  |  |  |  |
|  |  |  |  | UV-3300B (Mw 13000, bifunctional) |  |  |  |  |  |  |
|  |  |  |  | UV-3000B (Mw 18000, bifunctional) |  |  |  |  |  |  |
|  |  |  | Polymerizable compound other than X1 | DVE-3 (Mw 202, bifunctional) |  |  |  |  |  |  |
|  |  |  |  | PEA (Mw 192, monofunctional) |  |  |  |  |  |  |
|  |  | Photopolymerization initiator |  | IRG2959 | 1 | 1 | 1 | 1 | 1 | 1 |
|  |  |  |  | IRG819 | 1 | 1 | 1 | 1 | 1 | 1 |
|  |  | Surfactant |  | BYK331 | 0.1 | 0.1 | 0.1 | 0.1 | 0.1 | 0.1 |
|  |  | Polymerization inhibitor |  | UV12 | 0.1 | 0.1 | 0.1 | 0.1 | 0.1 | 0.1 |
|  |  | Polymer C1 |  | VINNOL E15/45 |  |  |  |  |  |  |
|  |  |  |  | VINNOL H14/36 |  | 3 | 3 | 3 | 3 | 3 |
|  |  |  |  | VINNOL E15/40A |  |  |  |  |  |  |
|  |  |  |  | BR-113 |  |  |  |  |  |  |
|  |  |  |  | LTH (polyester) | 3 |  |  |  |  |  |
|  |  |  |  | Polyacrylic acid |  |  |  |  |  |  |
|  |  | Organic solvent A1 |  | EGMEA (boiling point 145° C.) |  |  |  | 40 |  |  |
|  |  |  |  | MBA (boiling point 171° C.) |  |  |  |  | 86.8 |  |
|  |  |  |  | DEGDEE (boiling point 189° C.) | 86.8 | 86.8 | 86.8 | 46.8 |  |  |
|  |  |  |  | DEGBME (boiling point 212° C.) |  |  |  |  |  | 86.8 |
|  |  |  |  | Total | 100 | 100 | 100 | 100 | 100 | 100 |
|  |  | [C1/(C1 + X1)] × 100 |  |  | 50 | 50 | 50 | 50 | 50 | 50 |

TABLE 3-continued

| | | | | | | | | | |
|---|---|---|---|---|---|---|---|---|---|
| Clear ink | Polymerizable compound B2 | (Meth)acrylate compound X2 | CN996 (Mw 2850, bifunctional) | 10 | 12 | 10 | 10 | 10 | 10 |
| | | | G4316 (Mw 4000, trifunctional) | | | | | | |
| | | | UV-7630B (Mw 2200, hexafunctional) | 10 | 12 | 10 | 10 | 10 | 10 |
| | | Polymerizable compound other than X2 | DVE-3 (Mw 202, bifunctional) | | | 0.1 | | | |
| | | | #295 (Mw 296, trifunctional) | | | | 0.1 | | |
| | | | PEA (Mw 192, monofunctional) | | | | 0.1 | | |
| | Photopolymerization initiator | | IRG2959 | 5 | 6 | 5 | 5 | 5 | 5 |
| | | | IRG819 | 5 | 6 | 5 | 5 | 5 | 5 |
| | Polymerization inhibitor | | UV12 | 0.1 | 0.1 | 0.1 | 0.1 | 0.1 | 0.1 |
| | (Meth)acrylic-modified polyorganosiloxane | | R175S | 1 | 1 | 1 | 1 | 1 | 1 |
| | Organic solvent A2 | | DEGDEE (boiling point 189° C.) | 68.9 | 62.9 | 68.6 | 68.9 | 68.9 | 68.9 |
| | | | PC (boiling point 240° C.) | | | | | | |
| | | | IPA (boiling point 82° C.) | | | | | | |
| | | | MBA (boiling point 171° C.) | | | | | | |
| | | | Total | 100 | 100 | 100 | 100 | 100 | 100 |
| | | | X2 amount | 20 | 24 | 20 | 20 | 20 | 20 |
| | | | Solubility of C1 in A1 (mass %) | ≥10 | ≥10 | ≥10 | ≥10 | ≥10 | ≥10 |
| | | | Solubility of C1 in A2 (mass %) | ≥10 | ≥10 | ≥10 | ≥10 | ≥10 | ≥10 |
| | | | X2 amount-X1 amount | 17 | 21 | 17 | 17 | 17 | 17 |
| | | | Average number of functional groups of X1 | 2.00 | 2.00 | 2.00 | 2.00 | 2.00 | 2.00 |
| | | | Average number of functional groups of X2 | 4.00 | 4.00 | 4.00 | 4.00 | 4.00 | 4.00 |
| | | | Average number of functional groups of X2-average number of functional groups of X1 | 2.00 | 2.00 | 2.00 | 2.00 | 2.00 | 2.00 |
| Evaluation results | | | Jetting stability of colored ink | 4 | 5 | 5 | 3 | 5 | 5 |
| | | | Jetting stability of clear ink | 4 | 3 | 4 | 4 | 4 | 4 |
| | | | Abrasion resistance | 5 | 5 | 5 | 5 | 5 | 5 |
| | | | Alcohol resistance | 3 | 5 | 5 | 5 | 5 | 5 |
| | | | Flexibility | 5 | 5 | 5 | 5 | 5 | 5 |

TABLE 4

| | | | | Example 18 | Example 19 | Example 20 | Example 21 | Example 22 |
|---|---|---|---|---|---|---|---|---|
| Ink set | Colored ink | | Pigment millbase Cyan 1 | 5 | | | | 5 |
| | | | Pigment millbase Magenta 1 | | 5 | | | |
| | | | Pigment millbase Yellow 1 | | | 5 | | |
| | | | Pigment millbase Black 1 | | | | 5 | |
| | Polymerizable compound B1 | (Meth)acrylate compound X1 | UA-122P (Mw 1100, bifunctional) | | | | | |
| | | | CN996 (Mw 2850, bifunctional) | 8 | 3 | 3 | 3 | 3 |
| | | | UV-6630B (Mw 3000, bifunctional) | | | | | |
| | | | G4316 (Mw 4000, trifunctional) | | | | | |
| | | | UV-3310B (Mw 5000, bifunctional) | | | | | |
| | | | G4215 (Mw 5000, bifunctional) | | | | | |
| | | | UV-3300B (Mw 13000, bifunctional) | | | | | |
| | | | UV-3000B (Mw 18000, bifunctional) | | | | | |
| | | Polymerizable compound other than X1 | DVE-3 (Mw 202, bifunctional) | | | | | |
| | | | PEA (Mw 192, monofunctional) | | | | | |
| | Photopolymerization initiator | | IRG2959 | 1 | 1 | 1 | 1 | 1 |
| | | | IRG819 | 1 | 1 | 1 | 1 | 1 |
| | Surfactant | | BYK331 | 0.1 | 0.1 | 0.1 | 0.1 | 0.1 |
| | Polymerization inhibitor | | UV12 | 0.1 | 0.1 | 0.1 | 0.1 | 0.1 |
| | Polymer C1 | | VINNOL E15/45 | | | | | |
| | | | VINNOL H14/36 | 1.5 | 3 | 3 | 3 | 3 |
| | | | VINNOL E15/40A | | | | | |
| | | | BR-113 | | | | | |
| | | | LTH (polyester) | | | | | |
| | | | Polyacrylic acid | | | | | |

TABLE 4-continued

| | | | | | | | | |
|---|---|---|---|---|---|---|---|---|
| | | Organic solvent A1 | EGMEA (boiling point 145° C.) | | | | | |
| | | | MBA (boiling point 171° C.) | | | | | |
| | | | DEGDEE (boiling point 189° C.) | 83.3 | 86.8 | 86.8 | 86.8 | 86.8 |
| | | | DEGBME (boiling point 212° C.) | | | | | |
| | | | Total | 100 | 100 | 100 | 100 | 100 |
| | | | [C1 (C1 + X1)] × 100 | 16 | 50 | 50 | 50 | 50 |
| Clear ink | Polymerizable compound B2 | (Meth)acrylate compound X2 | CN996 (Mw 2850, bifunctional) | 10 | 10 | 10 | 10 | 10 |
| | | | G4316 (Mw 4000, trifunctional) | | | | | |
| | | | UV-7630B (Mw 2200, hexafunctional) | 10 | 10 | 10 | 10 | 10 |
| | | Polymerizable compound other than X2 | DVE-3 (Mw 202, bifunctional) | | | | | |
| | | | #295 (Mw 296, trifunctional) | | | | | |
| | | | PEA (Mw 192, monofunctional) | | | | | |
| | Photopolymerization initiator | | IRG2959 | 5 | 5 | 5 | 5 | 5 |
| | | | IRG819 | 5 | 5 | 5 | 5 | 5 |
| | Polymerization inhibitor | | UV12 | 0.1 | 0.1 | 0.1 | 0.1 | 0.1 |
| | (Meth)acrylic-modified polyorganosiloxane | | R175S | 1 | 1 | 1 | 1 | 1 |
| | Organic solvent A2 | | DEGDEE (boiling point 189° C.) | 68.9 | 68.9 | 68.9 | 68.9 | 58.9 |
| | | | PC (boiling point 240° C.) | | | | | 10 |
| | | | IPA (boiling point 82° C.) | | | | | |
| | | | MBA (boiling point 171° C.) | | | | | |
| | | | Total | 100 | 100 | 100 | 100 | 100 |
| | | | X2 amount | 20 | 20 | 20 | 20 | 20 |
| | | | Solubility of C1 in A1 (mass %) | ≥10 | ≥10 | ≥10 | ≥10 | ≥10 |
| | | | Solubility of C1 in A2 (mass %) | ≥10 | ≥10 | ≥10 | ≥10 | ≥10 |
| | | | X2 amount-X1 amount | 12 | 17 | 17 | 17 | 17 |
| | | | Average number of functional groups of X1 | 2.00 | 2.00 | 2.00 | 2.00 | 2.00 |
| | | | Average number of functional groups of X2 | 4.00 | 4.00 | 4.00 | 4.00 | 4.00 |
| | | | Average number of functional groups of X2-average number of functional groups of X1 | 2.00 | 2.00 | 2.00 | 2.00 | 2.00 |
| Evaluation results | | | Jetting stability of colored ink | 5 | 5 | 5 | 5 | 5 |
| | | | Jetting stability of clear ink | 4 | 4 | 4 | 4 | 4 |
| | | | Abrasion resistance | 5 | 5 | 5 | 5 | 5 |
| | | | Alcohol resistance | 5 | 5 | 5 | 5 | 5 |
| | | | Flexibility | 5 | 5 | 5 | 5 | 5 |

| | | | | Example 23 | Example 24 | Example 25 | Example 26 | Example 27 |
|---|---|---|---|---|---|---|---|---|
| Ink set | Colored ink | | Pigment millbase Cyan 1 | 5 | 5 | 5 | 5 | 5 |
| | | | Pigment millbase Magenta 1 | | | | | |
| | | | Pigment millbase Yellow 1 | | | | | |
| | | | Pigment millbase Black 1 | | | | | |
| | Polymerizable compound B1 | (Meth) acrylate compound X1 | UA-122P (Mw 1100, bifunctional) | | | | | |
| | | | CN996 (Mw 2850, bifunctional) | 3 | | | | |
| | | | UV-6630B (Mw 3000, bifunctional) | | 3 | | | |
| | | | G4316 (Mw 4000, trifunctional) | | | | | |
| | | | UV-3310B (Mw 5000, bifunctional) | | | 3 | | |
| | | | G4215 (Mw 5000, bifunctional) | | | | 3 | |
| | | | UV-3300B (Mw 13000, bifunctional) | | | | | 3 |
| | | | UV-3000B (Mw 18000, bifunctional) | | | | | |
| | Polymerizable compound other than X1 | | DVE-3 (Mw 202, bifunctional) | | | | | |
| | | | PEA (Mw 192, monofunctional) | | | | | |
| | Photopolymerization initiator | | IRG2959 | 1 | 1 | 1 | 1 | 1 |
| | | | IRG819 | 1 | 1 | 1 | 1 | 1 |
| | Surfactant | | BYK331 | 0.1 | 0.1 | 0.1 | 0.1 | 0.1 |
| | Polymerization inhibitor | | UV12 | 0.1 | 0.1 | 0.1 | 0.1 | 0.1 |
| | Polymer C1 | | VINNOL E15/45 | | | | | |
| | | | VINNOL H14/36 | 3 | 3 | 3 | 3 | 3 |
| | | | VINNOL E15/40A | | | | | |
| | | | BR-113 | | | | | |
| | | | LTH (polyester) | | | | | |
| | | | Polyacrylic acid | | | | | |
| | Organic solvent A1 | | EGMEA (boiling point 145° C.) | | | | | |
| | | | MBA (boiling point 171° C.) | | | | | |
| | | | DEGDEE (boiling point 189° C.) | 86.8 | 86.8 | 86.8 | 86.8 | 86.8 |
| | | | DEGBME (boiling point 212° C.) | | | | | |
| | | | Total | 100 | 100 | 100 | 100 | 100 |
| | | | [C1 (C1 + X1)] × 100 | 50 | 50 | 50 | 50 | 50 |
| Clear ink | Polymerizable compound B2 | (Meth)acrylate compound X2 | CN996 (Mw 2850, bifunctional) | 10 | 10 | 10 | 10 | 10 |
| | | | G4316 (Mw 4000, trifunctional) | | | | | |
| | | | UV-7630B (Mw 2200, hexafunctional) | 10 | 10 | 10 | 10 | 10 |
| | | Polymerizable compound other than X2 | DVE-3 (Mw 202, bifunctional) | | | | | |
| | | | #295 (Mw 296, trifunctional) | | | | | |
| | | | PEA (Mw 192, monofunctional) | | | | | |

TABLE 4-continued

|  |  |  |  |  |  |  |  |
|---|---|---|---|---|---|---|---|
| | Photopolymerization | IRG2959 | 5 | 5 | 5 | 5 | 5 |
| | initiator | IRG819 | 5 | 5 | 5 | 5 | 5 |
| | Polymerization inhibitor | UV12 | 0.1 | 0.1 | 0.1 | 0.1 | 0.1 |
| | (Meth)acrylic-modified polyorganosiloxane | R175S | 1 | 1 | 1 | 1 | 1 |
| | Organic solvent A2 | DEGDEE (boiling point 189° C.) | | 68.9 | 68.9 | 68.9 | 68.9 |
| | | PC (boiling point 240° C.) | | | | | |
| | | IPA (boiling point 82° C.) | | | | | |
| | | MBA (boiling point 171° C.) | 68.9 | | | | |
| | | Total | 100 | 100 | 100 | 100 | 100 |
| | | X2 amount | 20 | 20 | 20 | 20 | 20 |
| | | Solubility of C1 in A1 (mass %) | ≥10 | ≥10 | ≥10 | ≥10 | ≥10 |
| | | Solubility of C1 in A2 (mass %) | ≥10 | ≥10 | ≥10 | ≥10 | ≥10 |
| | | X2 amount-X1 amount | 17 | 17 | 17 | 17 | 17 |
| | | Average number of functional groups of X1 | 2.00 | 2.00 | 2.00 | 2.00 | 2.00 |
| | | Average number of functional groups of X2 | 4.00 | 4.00 | 4.00 | 4.00 | 4.00 |
| | | Average number of functional groups of X2-average number of functional groups of X1 | 2.00 | 2.00 | 2.00 | 2.00 | 2.00 |
| Evaluation results | | Jetting stability of colored ink | 5 | 5 | 5 | 5 | 5 |
| | | Jetting stability of clear ink | 4 | 4 | 4 | 4 | 4 |
| | | Abrasion resistance | 5 | 5 | 5 | 5 | 5 |
| | | Alcohol resistance | 5 | 5 | 5 | 5 | 5 |
| | | Flexibility | 5 | 5 | 5 | 5 | 5 |

TABLE 5

| | | | | Example 28 | Example 29 | Example 30 | Example 31 |
|---|---|---|---|---|---|---|---|
| Ink set | Colored ink | | Pigment millbase Cyan 1 | 5 | 5 | 5 | 5 |
| | | | Pigment millbase Magenta 1 | | | | |
| | | | Pigment millbase Yellow 1 | | | | |
| | | | Pigment millbase Black 1 | | | | |
| | Polymerizable compound B1 | (Meth)acrylate compound X1 | UA-122P (Mw 1100, bifunctional) | | | | |
| | | | CN996 (Mw 2850, bifunctional) | 2.88 | 1.5 | 3 | 3 |
| | | | UV-6630B (Mw 3000, bifunctional) | | | | |
| | | | G4316 (Mw 4000, trifunctional) | 0.12 | 1.5 | | |
| | | | UV-3310B (Mw 5000, bifunctional) | | | | |
| | | | G4215 (Mw 5000, bifunctional) | | | | |
| | | | UV-3300B (Mw 13000, bifunctional) | | | | |
| | | | UV-3000B (Mw 18000, bifunctional) | | | | |
| | | Polymerizable compound other than X1 | DVE-3 (Mw 202, bifunctional) | | | | |
| | | | PEA (Mw 192, monofunctional) | | | | |
| | Photopolymerization initiator | | IRG2959 | 1 | 1 | 1 | 1 |
| | | | IRG819 | 1 | 1 | 1 | 1 |
| | Surfactant | | BYK331 | 0.1 | 0.1 | 0.1 | 0.1 |
| | Polymerization inhibitor | | UV12 | 0.1 | 0.1 | 0.1 | 0.1 |
| | Polymer C1 | | VINNOL E15/45 | | | | |
| | | | VINNOL H14/36 | 1.5 | 1.5 | 3 | 3 |
| | | | VINNOL E15/40A | | | | |
| | | | BR-113 | | | | |
| | | | LTH (polyester) | | | | |
| | | | Polyacrylic acid | | | | |
| | Organic solvent A1 | | EGMEA (boiling point 145° C.) | | | | |
| | | | MBA (boiling point 171° C.) | | | | |
| | | | DEGDEE (boiling point 189° C.) | 88.3 | 88.3 | 86.8 | 86.8 |
| | | | DEGBME (boiling point 212° C.) | | | | |
| | | | Total | 100 | 100 | 100 | 100 |
| | | | [C1/(C1 + X1)] × 100 | 33 | 33 | 50 | 50 |
| Clear ink | Polymerizable compound B2 | (Meth)acrylate compound X2 | CN996 (Mw 2850, bifunctional) | 10 | 10 | 15 | 8 |
| | | | G4316 (Mw 4000, trifunctional) | | | | 12 |
| | | | UV-7630B (Mw 2200, hexafunctional) | 10 | 10 | 5 | |
| | | Polymerizable compound other than X2 | DVE-3 (Mw 202, bifunctional) | | | | |
| | | | #295 (Mw 296, trifunctional) | | | | |
| | | | PEA (Mw 192, monofunctional) | | | | |
| | Photopolymenzation initiator | | IRG2959 | 5 | 5 | 5 | 5 |
| | | | IRG819 | 5 | 5 | 5 | 5 |
| | Polymerization inhibitor | | UV12 | 0.1 | 0.1 | 0.1 | 0.1 |
| | (Meth)acrylic-modified polyorganosiloxane | | R175S | 1 | 1 | 1 | 1 |

TABLE 5-continued

| | | | | | | | |
|---|---|---|---|---|---|---|---|
| | | Organic solvent A2 | DEGDEE (boiling point 189° C.) | 68.9 | 68.9 | 68.9 | 68.9 |
| | | | PC (boiling point 240° C.) | | | | |
| | | | IPA (boiling point 82° C.) | | | | |
| | | | MBA (boiling point 171° C.) | | | | |
| | | | Total | 100 | 100 | 100 | 100 |
| | | | X2 amount | 20 | 20 | 20 | 20 |
| | | | Solubility of C1 in A1 (mass %) | ≥10 | ≥10 | ≥10 | ≥10 |
| | | | Solubility of C1 in A2 (mass %) | ≥10 | ≥10 | ≥10 | ≥10 |
| | | | X2 amount-X1 amount | 17 | 17 | 17 | 17 |
| | | | Average number of functional groups of X1 | 2.04 | 2.50 | 2.00 | 2.00 |
| | | | Average number of functional groups of X2 | 4.00 | 4.00 | 3.00 | 2.60 |
| | | | Average number of functional groups of X2-average number of functional groups of X1 | 1.96 | 1.50 | 1.00 | 0.60 |
| Evaluation results | | | Jetting stability of colored ink | 5 | 5 | 5 | 5 |
| | | | Jetting stability of clear ink | 4 | 4 | 4 | 4 |
| | | | Abrasion resistance | 5 | 5 | 5 | 5 |
| | | | Alcohol resistance | 5 | 5 | 5 | 4 |
| | | | Flexibility | 5 | 4 | 5 | 5 |

| | | | | | Example 32 | Example 33 | Example 34 |
|---|---|---|---|---|---|---|---|
| Ink set | Colored ink | | | Pigment millbase Cyan 1 | 5 | 5 | 5 |
| | | | | Pigment millbase Magenta 1 | | | |
| | | | | Pigment millbase Yellow 1 | | | |
| | | | | Pigment millbase Black 1 | | | |
| | | Polymerizable compound B1 | (Meth)acrylate compound X1 | UA-122P (Mw 1100, bifunctional) | | | |
| | | | | CN996 (Mw 2850, bifunctional) | 3 | 8 | 8 |
| | | | | UV-6630B (Mw 3000, bifunctional) | | | |
| | | | | G4316 (Mw 4000, trifunctional) | | | |
| | | | | UV-3310B (Mw 5000, bifunctional) | | | |
| | | | | G4215 (Mw 5000, bifunctional) | | | |
| | | | | UV-3300B (Mw 13000, bifunctional) | | | |
| | | | | UV-3000B (Mw 18000, bifunctional) | | | |
| | | | Polymerizable compound other than X1 | DVE-3 (Mw 202, bifunctional) | | | |
| | | | | PEA (Mw 192, monofunctional) | | | |
| | | Photopolymerization initiator | | IRG2959 | 1 | 3 | 3 |
| | | | | IRG819 | 1 | 3 | 3 |
| | | Surfactant | | BYK331 | 0.1 | 0.1 | 0.1 |
| | | Polymerization inhibitor | | UV12 | 0.1 | 0.1 | 0.1 |
| | | Polymer C1 | | VINNOL E15/45 | | | |
| | | | | VINNOL H14/36 | 3 | 3 | 3 |
| | | | | VINNOL E15/40A | | | |
| | | | | BR-113 | | | |
| | | | | LTH (polyester) | | | |
| | | | | Polyacrylic acid | | | |
| | | Organic solvent A1 | | EGMEA (boiling point 145° C.) | | | |
| | | | | MBA (boiling point 171° C.) | | | |
| | | | | DEGDEE (boiling point 189° C.) | 86.8 | 77.8 | 77.8 |
| | | | | DEGBME (boiling point 212° C.) | | | |
| | | | | Total | 100 | 100 | 100 |
| | | | | [C1/(C1 + X1)] × 100 | 50 | 27 | 27 |
| | Clear ink | Polymerizable compound B2 | (Meth)acrylate compound X2 | CN996 (Mw 2850, bifunctional) | 18 | 7 | 6 |
| | | | | G4316 (Mw 4000, trifunctional) | | | |
| | | | | UV-7630B (Mw 2200, hexafunctional) | 2 | 7 | 6 |
| | | | Polymerizable compound other than X2 | DVE-3 (Mw 202, bifunctional) | | | |
| | | | | #295 (Mw 296, trifunctional) | | | |
| | | | | PEA (Mw 192, monofunctional) | | | |
| | | Photopolymenzation initiator | | IRG2959 | 5 | 5 | 5 |
| | | | | IRG819 | 5 | 5 | 5 |
| | | Polymerization inhibitor | | UV12 | 0.1 | 0.1 | 0.1 |
| | | (Meth)acrylic-modified polyorganosiloxane | | R175S | 1 | 1 | 1 |
| | | Organic solvent A2 | | DEGDEE (boiling point 189° C.) | 68.9 | 74.9 | 76.9 |
| | | | | PC (boiling point 240° C.) | | | |
| | | | | IPA (boiling point 82° C.) | | | |
| | | | | MBA (boiling point 171° C.) | | | |
| | | | | Total | 100 | 100 | 100 |
| | | | | X2 amount | 20 | 14 | 12 |
| | | | | Solubility of C1 in A1 (mass %) | ≥10 | ≥10 | ≥10 |
| | | | | Solubility of C1 in A2 (mass %) | ≥10 | ≥10 | ≥10 |
| | | | | X2 amount-X1 amount | 17 | 6 | 4 |
| | | | | Average number of functional groups of X1 | 2.00 | 2.00 | 2.00 |
| | | | | Average number of functional groups of X2 | 2.40 | 4.00 | 4.00 |
| | | | | Average number of functional groups of X2-average number of functional groups of X1 | 0.40 | 2.00 | 2.00 |

TABLE 5-continued

| Evaluation results | | | | |
|---|---|---|---|---|
| | Jetting stability of colored ink | 5 | 5 | 5 |
| | Jetting stability of clear ink | 4 | 4 | 4 |
| | Abrasion resistance | 5 | 5 | 5 |
| | Alcohol resistance | 3 | 5 | 4 |
| | Flexibility | 5 | 5 | 5 |

<Explanation of Table 2 to Table 5>

In Table 2 to Table 5, the numbers described in the column of each component represent the amounts (parts by mass) of the component.

In Table 2 to Table 5, the "X2 amount" represents the content (mass %) of the (meth)acrylate compound X2 in the clear ink, and the "X1 amount" represents the content (mass %) of the (meth)acrylate compound X1 in the colored ink.

In Table 2 to Table 5, "[C1/(C1+X1)]×100" represents the content (mass %) of the polymer C1 with respect to the total amount of the polymer C1 and the (meth)acrylate compound X1 in the colored ink.

The details of the various components in Table 2 to Table 5 are as follows.

—Bifunctional or Higher-Functional (meth)acrylate Compounds (X1 and X2) Having Weight Average Molecular Weight of 1,000 to 30,000—

UA-122P . . . Bifunctional urethane acrylate (weight average molecular weight (hereinafter, described as "Mw")= 1,100) of Shin Nakamura Chemical Co., Ltd.

CN996 . . . Bifunctional urethane acrylate (Mw=2,850) of Sartomer Company, Inc.

UV-3000B . . . "SHIKOH (registered trademark) UV-3000B" (bifunctional urethane acrylate, Mw=18,000) of Nippon Synthetic Chemical Industry Co., Ltd.

UV-3300B . . . "SHIKOH (registered trademark) UV-3300B" (bifunctional urethane acrylate, Mw=13,000) of Nippon Synthetic Chemical Industry Co., Ltd.

UV-3310B . . . "SHIKOH (registered trademark) UV-3310B" (bifunctional urethane acrylate, Mw=5,000) of Nippon Synthetic Chemical Industry Co., Ltd.

UV-6630B . . . "SHIKOH (registered trademark) UV-6630B" (bifunctional urethane acrylate, Mw=3,000) of Nippon Synthetic Chemical Industry Co., Ltd.

UV-7630B . . . "SHIKOH (registered trademark) UV-7630B" (hexafunctional urethane acrylate, Mw=2,200) of Nippon Synthetic Chemical Industry Co., Ltd.

G4316 . . . "GENOMER 4316" (trifunctional urethane acrylate, Mw=4,000) manufactured by Rahn AG G4215 . . . "GENOMER 4215" (bifunctional urethane acrylate, Mw=5,000) manufactured by Rahn AG —Polymerizable Compound Other than Bifunctional or Higher-Functional (meth)acrylate Compounds (X1 and X2) Having Weight Average Molecular Weight of 1,000 to 30,000—

PEA . . . Phenoxyethyl acrylate (MW=192) ("SR339C" of Sartomer Company, Inc.; monofunctional polymerizable monomer)

DVE-3 . . . Triethylene glycol divinyl ether (Mw=202) (bifunctional polymerizable monomer of BASF SE)

295 . . . Trimethylolpropane triacrylate (Mw=296) (trifunctional polymerizable monomer "VISCOAT #295" of Osaka Organic Chemical Industry, Ltd.)

—Photopolymerization Initiator—

IRG2959 . . . "IRGACURE 2959" (1-[4-(2-hydroxy-ethoxy)-phenyl]-2-hydroxy-2-methyl-1-prop an-1-one) of BASF SE IRG819 . . . "IRGACURE 819" (bis(2,4,6-trimethylbenzoyl)-phenylphosphine oxide) of BASF SE —Surfactant—

BYK331 . . . Polyether-modified polydimethylsiloxane of BYK Chemie Japan K.K.

—Polymerization Inhibitor—

UV12 . . . Nitroso-based polymerization inhibitor, tris(N-nitroso-N-phenylhydroxylamine)aluminum salt, Kromachem, Ltd., FLORSTAB UV12

—Polymer C1 (Polymer C1 that does not have Polymerizable Group)—

VINNOL E15/45 . . . Vinyl chloride-vinyl acetate copolymer resin (copolymerization mass ratio [vinyl chloride:vinyl acetate]=84.9:15.1, Mw=50,000) of Wacker Chemie AG VINNOL H14/36 . . . Vinyl chloride-vinyl acetate copolymer resin (copolymerization mass ratio [vinyl chloride:vinyl acetate]=85.6:14.4, Mw=34,000) of Wacker Chemie AG VINNOL E15/40A . . . Vinyl chloride-vinyl acetate copolymer resin containing hydroxy groups (copolymerization mass ratio [vinyl chloride:vinyl acetate]=about 84:about 16, Mw=45,000) of Wacker Chemie AG BR-113 . . . (Meth)acrylic resin ("DIANAL BR-113"; Mw=30,000) of Mitsubishi Rayon Co., Ltd.

LTH . . . Polyester resin ("TEGO addbond LTH"; Mw=3,000) of Evonik Japan Co., Ltd.

Polyacrylic acid . . . "Polyacrylic acid 5000" (Mw=5,000) of Wako Pure Chemical Industries, Ltd.

—Organic Solvent A1 and Organic Solvent A2—

EGMEA . . . Tokyo Chemical Industry Co., Ltd., ethylene glycol monomethyl ether acetate (boiling point 145° C.)

MBA . . . Tokyo Chemical Industry Co., Ltd., 3-methoxybutyl acetate (boiling point 171° C.)

DEGDEE . . . Tokyo Chemical Industry Co., Ltd., diethylene glycol diethyl ether (boiling point 189° C.)

DEGBME . . . Wako Pure Chemical Industries, Ltd., diethylene glycol butyl methyl ether (boiling point 212° C.)

PC . . . Tokyo Chemical Industry Co., Ltd., propylene carbonate (boiling point 240° C.)

IPA . . . Tokyo Chemical Industry Co., Ltd., isopropyl alcohol (boiling point 82° C.)

—(Meth)acrylic-Modified Polyorganosiloxane—

R175S . . . (Meth)acrylic-modified polyorganosiloxane "CHALINE (registered trademark) R175S" of Nissin Chemical Industry Co., Ltd.

As shown in Table 2 to Table 5, in Examples 1 to 34 making use of ink sets comprising a colored ink that includes an organic solvent A1, a polymer C1 that does not have a polymerizable group, and a colorant, in which the content of the organic solvent A1 with respect to the total amount of the colored ink is 30% by mass or more; and a clear ink that includes an organic solvent A2 and a bifunctional or higher-functional (meth)acrylate compound X2 having a weight average molecular weight of 1,000 to 30,000, in which the content of the organic solvent A2 with respect to the total amount of the clear ink is 30% by mass or more, while the content of the (meth)acrylate compound X2 with respect to the total amount of the clear ink is 5% by mass or more, wherein the solubility at 25° C. of the polymer C1 in the organic solvent A2 is 10% by mass or higher, the overcoat film-attached colored images had excellent scratch resistance, alcohol resistance, and flexibility.

In contrast to Examples 1 to 34, in Comparative Example 1 making use of an ink set comprising a colored ink in which the content of the organic solvent A1 with respect to the total amount of the colored ink is less than 30% by mass, the flexibility of the overcoat film-attached colored image was deteriorated. This is speculated to be because, since the content of the organic solvent A1 with respect to the total amount of the colored ink is less than 30% by mass, the thickness of the layer formed by the colored ink (colored image) increases, and as a result, flexibility of the colored image is decreased.

Furthermore, in this Comparative Example 1, the alcohol resistance of the overcoat film-attached colored image also deteriorated. This is speculated to be because, since the content of the organic solvent A1 with respect to the total amount of the colored ink is less than 30% by mass, the proportion of the polymer C1 in the solid content of the colored ink is lowered, and thus the alcohol resistance of the colored image is deteriorated.

Furthermore, in this Comparative Example 1, since the content of the organic solvent A1 in the colored ink is less than 30% by mass, the jetting stability of the colored ink also decreased.

In Comparative Example 2 making use of an ink set comprising a colored ink that does not include a polymer C1, the alcohol resistance of the overcoat film-attached colored image was deteriorated.

In Comparative Example 3 making use of an ink set comprising a clear ink in which the content of the organic solvent A2 with respect to the total amount of the clear ink is less than 30% by mass, the flexibility of the overcoat film-attached colored image was deteriorated. Furthermore, in this Comparative Example 3, since the content of the organic solvent A2 in the clear ink is less than 30% by mass, the jetting stability of the clear ink also decreased.

In Comparative Example 4 making use of an ink set comprising a colored ink in which the content of the (meth)acrylate compound X2 with respect to the total amount of the clear ink is less than 5% by mass, the flexibility and strength of the overcoat film could not be secured, and the flexibility and alcohol resistance of the overcoat film-attached colored image were deteriorated.

In Comparative Examples 5 and 6 making use of an ink set in which the solubility at 25° C. of the polymer C1 in the organic solvent A2 is lower than 10% by mass, the flexibility of the overcoat film-attached colored image was deteriorated.

The entire disclosure of JP2016-071746 filed on Mar. 31, 2016, is incorporated herein by reference.

All publications, patent applications, and technical standards mentioned in the present specification are herein incorporated by reference to the same extent as if each individual publication, patent application, or technical standard was specifically and individually indicated to be incorporated by reference.

What is claimed is:

1. An ink set, comprising:
    a colored ink including an organic solvent A1, a polymer C1 that does not have a polymerizable group, and a colorant, the colored ink including the organic solvent A1 at a content of 30% by mass or more with respect to the total amount of the colored ink; and
    a clear ink including an organic solvent A2 and a bifunctional or higher-functional (meth)acrylate compound X2 having a weight average molecular weight of from 1,000 to 30,000, the clear ink including the organic solvent A2 at a content of 30% by mass or more with respect to the total amount of the clear ink and including the (meth)acrylate compound X2 at a content of 5% by mass or more with respect to the total amount of the clear ink,
    wherein the solubility at 25° C. of the polymer C1 in the organic solvent A2 is 10% by mass or higher.

2. The ink set according to claim 1, wherein the colored ink further includes a bifunctional or higher-functional (meth)acrylate compound X1 having a weight average molecular weight of 1,000 to 30,000.

3. The ink set according to claim 2, wherein the content of the (meth)acrylate compound X2 in the clear ink is larger than the content of the (meth)acrylate compound X1 in the colored ink, and the average number of functional groups of the (meth)acrylate compound X2 in the clear ink is larger than the average number of functional groups of the (meth)acrylate compound X1 in the colored ink.

4. The ink set according to claim 2, wherein the content of the (meth)acrylate compound X1 with respect to the total amount of the colored ink is 1% by mass or more.

5. The ink set according to 4, wherein in the colored ink, the content of the polymer C1 with respect to the total amount of the polymer C1 and the (meth)acrylate compound X1 is from 15% by mass to 50% by mass.

6. The ink set according to claim 3, wherein the content of the (meth)acrylate compound X1 with respect to the total amount of the colored ink is 1% by mass or more.

7. The ink set according to claim 5, wherein in the colored ink, the content of the polymer C1 is from 15% by mass to 50% by mass with respect to the total amount of the polymer C1 and the (meth)acrylate compound X1, and is from 1% by mass to 10% by mass with respect to the total amount of the colored ink.

8. The ink set according to claim 7, wherein the polymer C1 is a vinyl chloride-based resin, and the weight average molecular weight of the polymer C1 is from 3,000 to 200,000.

9. The ink set according to claim 8, wherein the clear ink further includes a (meth)acrylic-modified polyorganosiloxane, the colored ink is a colored inkjet ink, and the clear ink is a clear inkjet ink.

10. The ink set according to claim 9, wherein
    the proportion occupied by at least one compound selected from the group consisting of a glycol ether, an organic carbonate, and an ester in the organic solvent A1 is 80% by mass to 100% by mass, and
    the proportion occupied by at least one compound selected from the group consisting of a glycol ether, an organic carbonate, and an ester in the organic solvent A2 is 80% by mass to 100% by mass.

11. The ink set according to claim 10, wherein
    the solubility of the polymer C1 in the organic solvent A1 at a temperature of 25° C. is 10% by mass or higher,
    the proportion occupied by a compound having a boiling point of 150° C. to 250° C. in the organic solvent A1 is from 80% by mass to 100% by mass, and
    the proportion occupied by a compound having a boiling point of 150° C. to 250° C. in the organic solvent A2 is from 80% by mass to 100% by mass.

12. The ink set according to claim 1, wherein the content of the polymer C1 in the colored ink is from 1% by mass to 10% by mass with respect to the total amount of the colored ink.

13. The ink set according to claim 1, wherein the weight average molecular weight of the polymer C1 is from 3,000 to 200,000.

14. The ink set according to claim 1, wherein the polymer C1 is a vinyl chloride-based resin.

15. The ink set according to claim 1, wherein the clear ink further includes a (meth)acrylic-modified polyorganosiloxane.

16. The ink set according to claim 1, wherein the colored ink is a colored inkjet ink, and the clear ink is a clear inkjet ink.

17. The ink set according to claim 1, wherein
the proportion occupied by at least one compound selected from the group consisting of a glycol ether, an organic carbonate, and an ester in the organic solvent A1 is from 80% by mass to 100% by mass, and
the proportion occupied by at least one compound selected from the group consisting of a glycol ether, an organic carbonate, and an ester in the organic solvent A2 is from 80% by mass to 100% by mass.

18. The ink set according to claim 1, wherein
the proportion occupied by a compound having a boiling point of 150° C. to 250° C. in the organic solvent A1 is from 80% by mass to 100% by mass, and
the proportion occupied by a compound having a boiling point of 150° C. to 250° C. in the organic solvent A2 is from 80% by mass to 100% by mass.

19. The ink set according to claim 1, wherein the solubility of the polymer C1 in the organic solvent A1 at a temperature of 25° C. is 10% by mass or higher.

20. An image forming method by using the ink set according to claim 1, the method comprising:
a colored image forming step of applying the colored ink on a substrate and thereby forming a colored image; and
a clear image forming step of applying the clear ink at least on the colored image, irradiating the applied clear ink with active energy ray, and thereby forming a clear image at least on the colored image.

* * * * *